United States Patent
Tagawa

(10) Patent No.: US 8,760,741 B2
(45) Date of Patent: Jun. 24, 2014

(54) IMAGE SCANNING DEVICE, IMAGE FORMING DEVICE, AND METHOD FOR CORRECTING PIXEL VALUE FOR PIXEL CORRESPONDING TO POSITION OF ROD LENS ARRAY JOINT

(75) Inventor: Hirotoshi Tagawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 160 days.

(21) Appl. No.: 13/450,778

(22) Filed: Apr. 19, 2012

(65) Prior Publication Data

US 2012/0307325 A1 Dec. 6, 2012

(30) Foreign Application Priority Data

May 31, 2011 (JP) ................................. 2011-121564

(51) Int. Cl.
*H04N 1/46* (2006.01)

(52) U.S. Cl.
USPC ............ 358/518; 358/504; 358/505; 358/537

(58) Field of Classification Search
None
See application file for complete search history.

(56) References Cited

U.S. PATENT DOCUMENTS

| 5,241,347 | A | * | 8/1993 | Kodama | .......................... 399/49 |
| 2005/0161583 | A1 | | 7/2005 | Matsumoto | |
| 2010/0315687 | A1 | * | 12/2010 | Sakane | ........................ 358/461 |
| 2011/0007368 | A1 | | 1/2011 | Saito | |
| 2011/0043874 | A1 | * | 2/2011 | Saika | ............................ 358/475 |
| 2011/0181921 | A1 | * | 7/2011 | Fukutome et al. | ............ 358/474 |

FOREIGN PATENT DOCUMENTS

| JP | 01-241268 A | 9/1989 |
| JP | 2003-283825 A | 10/2003 |
| JP | 2005-217630 A | 8/2005 |
| JP | 2007-135025 A | 5/2007 |

* cited by examiner

*Primary Examiner* — Benny Q Tieu
*Assistant Examiner* — Haris Sabah
(74) *Attorney, Agent, or Firm* — Morgan, Lewis & Bockius LLP

(57) ABSTRACT

An image scanning device has an image sensor including a plurality of arrayed light receiving elements; a light source for shining light upon a scanning object; a lens unit for guiding reflected light from a scanning object to the image sensor and having a plurality of rod lens arrays, in which a plurality of rod lenses are arrayed, joined together; and a correction unit for generating image data based on the output values from the light receiving elements of the image sensor and correcting the pixel values of pixels in the image data corresponding to a position of a joint section between rod lens arrays so that the pixel values become darker.

7 Claims, 15 Drawing Sheets

IMAGE SCANNING DEVICE, IMAGE FORMING DEVICE, AND METHOD FOR CORRECTING PIXEL VALUE FOR PIXEL CORRESPONDING TO POSITION OF ROD LENS ARRAY JOINT

This application is based upon and claims the benefit of priority from the corresponding Japanese Patent Application No. 2011-121564, filed May 31, 2011, the entire contents of which are incorporated herein by reference.

BACKGROUND OF THE DISCLOSURE

1. Field of the Disclosure

The present disclosure relates to an image scanning device that scans and performs shading correction in a document. The present disclosure also relates to an image forming device having this image scanning device. The present disclosure also relates to a method for correcting a pixel value in the image scanning device.

2. Description of Related Art

An image scanning device emits light from a light source, and sends light reflected off a document to an image sensor to obtain image data. An image scanning device may also be provided in an image forming device such as a multifunction peripheral, a copying machine, a FAX device, or the like. An image scanning device may also be installed with an attachable image sensor unit called a contact image sensor (CIS). This CIS unit may be provided with a rod lens array, in which rod-shaped lenses are lined up in a primary scanning direction. In such a case, the rod lens array must have the same length as the scanning width (primary scanning direction width). However, obtaining a special product to match the scanning width (a specially-ordered rod lens array longer than a standard product) can lead to high costs. As such, the practice exists of connecting a number of cut standard rod lens arrays in general use to create a rod lens array of a desired length. For example, in order to enable scanning of a tabloid-size or A3-size sheet, a rod lens array with a short width for scanning letter-size or A4-size sheets is cut, and a plurality of cut rod lens arrays are connected to obtain a tabloid-size or A3-size width rod lens array.

For instance, a technique such as that described below is known in relation to connecting rod lens arrays. Specifically, an image sensor unit is known that has a sensor substrate upon which a plurality of photoelectric conversion elements are mounted, a light source for illuminating a document, an imaging element for forming an image on the sensor substrate from light reflected off the document, and a frame supporting all of the above; wherein, in the imaging element, a plurality of rod lens arrays cut at at least one end in a lengthwise direction are connected to each other at the cut ends to yield a pre-determined scanning width; the frame has a retainer for retaining the rod lens arrays; and the retainer has a broad bottom surface at which the cut parts and/or connecting parts of the rod lens arrays are positioned, and has a burr recess provided along both walls of the retainer that reaches a higher end than the broad bottom surface. This configuration attempts to eliminate the effects of burrs, without the need to monitor the direction of the rod lens arrays before and after connection or to perform deburring, by providing clearance for burrs generated on the cut surfaces during cutting.

By cutting and joining together rod lens arrays, a rod lens array of a desired length can be inexpensively obtained. In general, the rod lens arrays are connected using an adhesive. However, gaps can form due to variations in adhesion or deviations during cutting.

Thus, ambient light other than the light reflected off of the document may reach the image sensor through these gaps. When the light source is lit, ambient light may be mixed with the reflected light from the document at light receiving elements within the image sensor located at the joints between rod lens arrays. Because of this, within the image data obtained from the image sensor, those pixels positioned at the joint sections between rod lens arrays becomes brighter by the amount of ambient light. The problem arises that when portions that are brighter than they should be continue into the secondary scanning direction, they may be perceptible as white or gray streaks (streaking).

A UV-curing adhesive may be used as the adhesive in order to fit the rod lens arrays closely together and bond them together immediately while maintaining them in a proper state. It is preferable that the adhesive cure within a short amount of time after being irradiated with UV light. Thus, a transparent UV-curing adhesive, which easily allows UV light to penetrate, is preferable. However, a transparent adhesive allows ambient light to penetrate.

In order to prevent ambient light from reaching the image sensor, the use of a non-transparent UV-curing adhesive is also conceivable. However, non-transparent adhesives may not readily harden upon UV exposure. Also, because a CIS-type image sensor unit has a shallow depth of field, the rod lens arrays must be strictly positioned, and there is a fixed limit on the amount of adhesive used, which may make it difficult to apply enough adhesive to fill all the gaps.

In the known image sensor unit described above, the possibility of ambient light entering through gaps and creating streaks also remains. When, for example, one attempts to introduce a sealant in order to fill all the gaps while avoiding any contamination of the rod lenses, the sealant must be introduced with great delicacy and accuracy, which requires more work and can lead to cost-related problems.

SUMMARY OF THE DISCLOSURE

The present disclosure was contrived in light of the problems in the prior art as described above, it being an object thereof to prevent streaking in the scanning results of an image scanning device even when a rod lens array in which cut rod lens arrays are joined together with a transparent adhesive or the like is used.

In order to achieve the above object, an image scanning device according to a first aspect of the present disclosure has an image sensor including a plurality of arrayed light receiving elements; a light source for shining light upon a scanning object; a lens unit for sending reflected light from a scanning object to the image sensor and having a plurality of rod lens arrays, in which a plurality of rod lenses are arrayed, joined together; and a correction unit for correcting the pixel values of pixels corresponding to positions of joints between rod lens arrays in image data generated based on the output values from the light receiving elements of the image sensor.

As a consequence thereof, the image scanning device is capable of eliminating streaks/streaking due to ambient light admitted through gaps between the rod lens arrays in the scanning results (image data) even when the device includes a lens unit in which a transparent adhesive has been used to connect a plurality of rod lens arrays.

Further features and advantages of the present disclosure will become still more apparent from the description of embodiments given below.

DETAILED DESCRIPTION OF PREFERRED EMBODIMENTS

There follows a description of an embodiment of the present disclosure with reference to FIGS. 1 through 19. A first embodiment will first be described with reference to FIGS. 1 through 12. However, the various elements of the embodiment, such as the configuration, arrangement, and the like, are merely for the sake of description, and in no way limit the scope of the disclosure.

(Outline of the Configuration of a Multifunction Peripheral 100)

Figure 1:
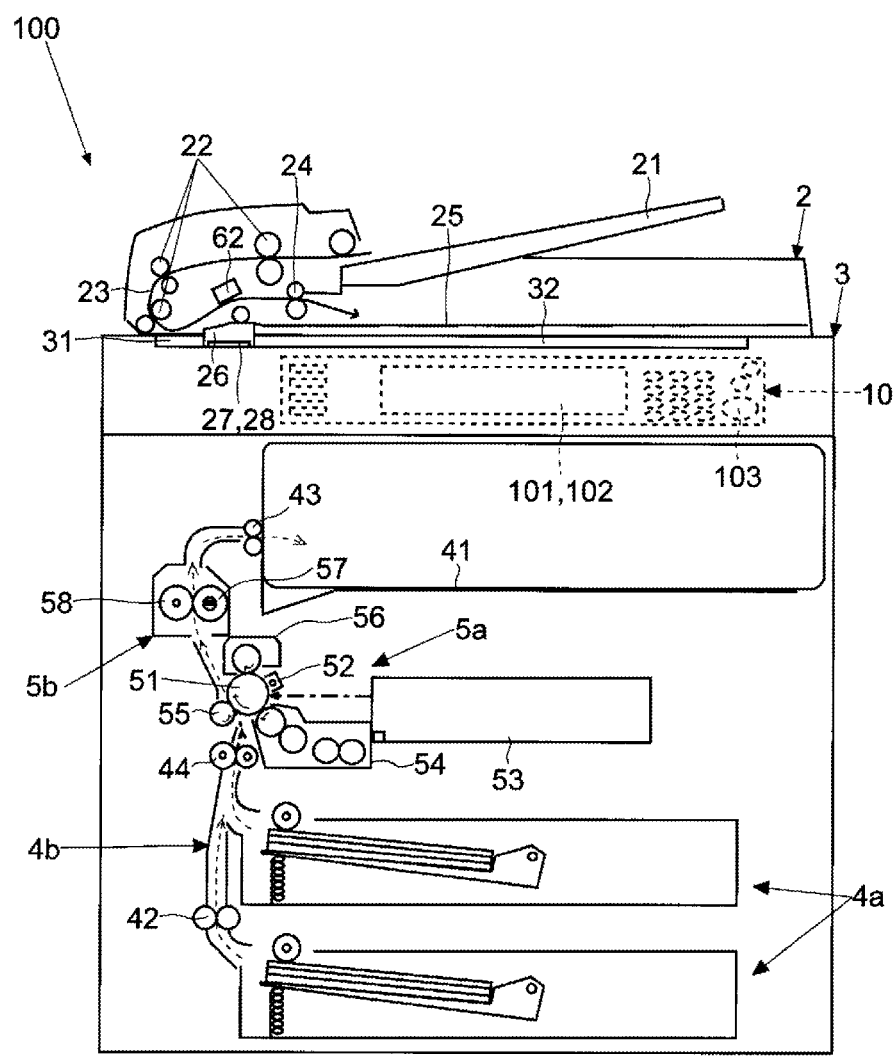
FIG. 1 is a schematic front cross-sectional view of a multifunction peripheral.

First, an outline of a multifunction peripheral 100 (corresponding to an image forming device) including an image scanning device 1 according to a first embodiment will be described with reference to FIG. 1. FIG. 1 is a schematic front cross-sectional view of a multifunction peripheral 100.

As shown in FIG. 1, the multifunction peripheral 100 of this embodiment has an image scanning device 1 including a document feeding device 2 and an image scanner 3 in an upper portion thereof (described in detail hereafter). A control panel 10 is provided on a front surface of the image scanner 3; and a paper feeder 4a, feeding path 4b, image forming unit 5a, and fuser 5b are provided within the body of the multifunction peripheral 100.

As shown by the dotted lines in FIG. 1, the control panel 10 is provided on an upper portion of the front surface of the multifunction peripheral 100. The control panel 10 has an LCD 101 that displays the status of the multifunction peripheral 100 and various messages. The LCD 101 is capable of displaying one or more keys for selecting functions, inputting settings or characters, or the like. A touch panel 102 (for example, a resistive touchscreen) is provided on an upper surface of the LCD 101. The touch panel 102 is for determining the position/coordinates of a touched part of the LCD 101. Various hard keys, such as a START key 103 for commanding the start of copying and other various functions, may also be provided to the control panel 10.

The paper feeder 4a contains a plurality of paper types (for example, various sheets of copy paper, regular paper, recycled paper, cardboard, overhead project sheets, and the like), and feeds one sheet thereof at a time into the feeding path 4b. The feeding path 4b is a channel for feeding paper from the paper feeder 4a to a delivery tray 41. Feed roller pairs 42, 43 that rotate when paper is being conveyed and a resist roller pair 44, which halts fed paper before the image forming unit 5a and times the feeding thereof so as to coincide with toner image formation, are provided along the feeding path 4b.

The image forming unit 5a forms a toner image based on image data, and transfers the toner image to the fed paper. To this end, the image forming unit 5a has a photosensitive drum 51 supported so as to be rotatably drivable in a direction indicated by an arrow in FIG. 1, an electrostatic device 52, an exposure device 53, a developer device 54, a transfer roller 55, a cleaning device 56, and the like disposed on a periphery of the photosensitive drum 51.

Hereafter follows a description of a process of forming and transferring a toner image. The photosensitive drum 51 is provided roughly in the center of the image forming unit 5a, and is rotated in a predetermined direction. The electrostatic device 52 imparts the photosensitive drum 51 with an electrostatic charge of a predetermined potential. In FIG. 1, the exposure device 53 outputs laser light based on image data, and scans and exposes the surface of the photosensitive drum 51 to form a latent electrostatic image corresponding to the image data. Image data obtained by the image scanner 3, image data sent from an external computer 200 or sender FAX device 300 (see FIG. 5) connected to a network or the like, or the like is used as the image data.

The developer device 54 supplies toner to the latent electrostatic image formed on the photosensitive drum 51 to develop the image. The photosensitive drum 51 presses upon the transfer roller 55 to form a nip. Paper advances into the nip at a timing coinciding with the formation of the toner image. When paper advances in, a predetermined voltage is applied to the transfer roller 55, and the toner image on the photosensitive drum 51 is transferred to the paper. After image transfer, the cleaning device 56 removes any toner remaining on the photosensitive drum 51.

The fuser 5b fuses the transferred toner image to the paper. The fuser 5b of this embodiment has a heating roller 57 containing a heat source and a pressure roller 58. The heating roller 57 and pressure roller 58 press together to form a nip. When the paper passes through this nip, the toner on the paper surface is heated and melted, and received by the delivery tray 41. In this way, image formation (printing) is performed when the copier or printer function is used.

(Outline of Image Scanning Device 1)

Figure 2:
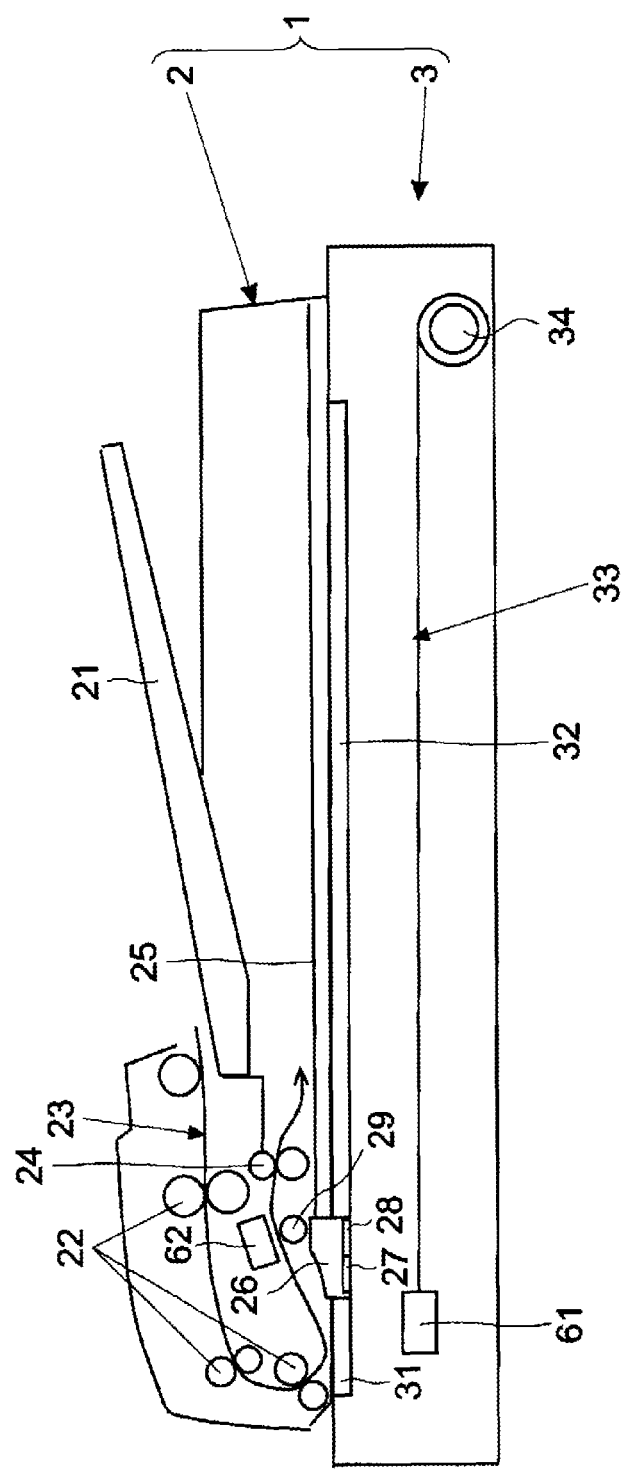
FIG. 2 is a schematic front cross-sectional view of one example of an image scanning device.

Next, the image scanning device 1 according to the first embodiment will be described with reference to FIG. 2. FIG. 2 is a schematic front cross-sectional view of one example of the image scanning device 1.

The image scanning device 1 of this embodiment has a document feeding device 2 and an image scanner 3. The document feeding device 2 has a document tray 21 upon which the document to be scanned is placed, a plurality of document feed roller pairs 22 for feeding the document, a document feeding path 23, a document Delivery roller pair 24, and a document Delivery tray 25. The document on the document tray 21 is fed into the document feeding path 23 one sheet at a time. The fed document is automatically and continuously fed so as to contact a feed scanning contact glass 31 on an upper surface of the image scanner 3. The document Delivery roller pair 24 delivers the document after scanning to the document Delivery tray 25. The document feeding device 2 can also be raised using a support point (not illustrated) provided in back as viewed from the surface of the drawing, enabling a document such as a book or the like to be placed upon a manual scanning contact glass 32 on the upper surface of the image scanner 3.

Next, the image scanner 3 shines light upon the document passing by the feed scanning contact glass 31 or the document placed upon the manual scanning contact glass 32. The image scanner 3 then scans the document and generates image data on basis of reflected light. To that end, the image scanner 3 is provided with a CIS-type (contact image sensor) first scanning unit 61 (scanning unit 6), described in detail hereafter.

The first scanning unit 61 is connected to a take-up drum 34 by a wire 33. The take-up drum 34 is caused to rotate by a take-up motor 35 (see FIG. 6) that rotates in positive and reverse directions. It is thereby possible for the first scanning unit 61 to be moved unrestrictedly in a horizontal direction (a left/right direction of the multifunction peripheral 100). When a document placed on the manual scanning contact glass 32 is to be scanned, the take-up drum 34 is rotatably driven, whereby the first scanning unit 61 is moved in the horizontal direction, and scanning is performed. When using the document feeding device 2 to scan a document, the first scanning unit 61 is fixed in place below the feed scanning contact glass 31.

A guide member 26 for guiding the fed document is provided between the feed scanning contact glass 31 and the manual scanning contact glass 32. A solid-white white reference strip 27 for obtaining a white reference and a correction reference strip 28 (corresponding to a corrective scanning object) used to correct a black reference value are provided on a lower surface of the guide member 26. Each reference strip extends in the primary scanning direction (direction perpendicular to the document feeding direction; direction perpendicular to the plane of FIG. 3) of the image scanning device 1.

The document feeding path 23 is provided with a contact image sensor (CIS)-type second scanning unit 62 (scanning unit 6). For example, the second scanning unit 62 is provided between the feed scanning contact glass 31 and the document Delivery roller pair 24. The second scanning unit 62 scans the reverse side of a document printed on both surfaces. This allows both sides of the document to be scanned on a single pass through the document feeding path 23. Because the document printed on both sides is scanned automatically, both sides of the document can be easily scanned without the need to reverse the feed direction of the document or provide a complex document feeding path 23. A white reference roller 29 for obtaining a white reference value is provided in opposition to the second scanning unit 62. The solid-white white reference strip 27 may be provided in lieu of the white reference roller 29.

(Scanning Unit 6)

Figure 3A:
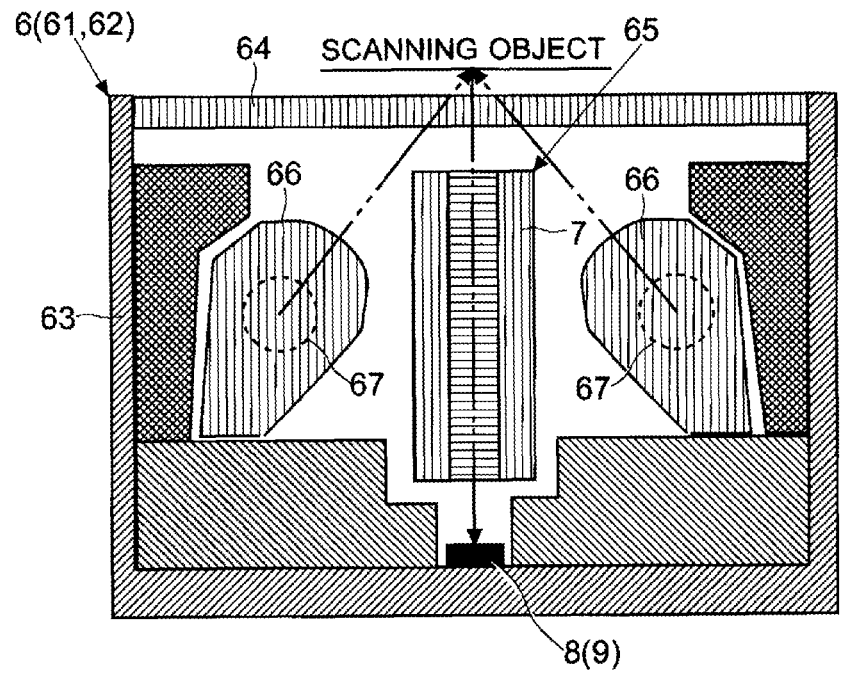
FIG. 3A is a cross-sectional view of a scanning unit.
Figure 3B:
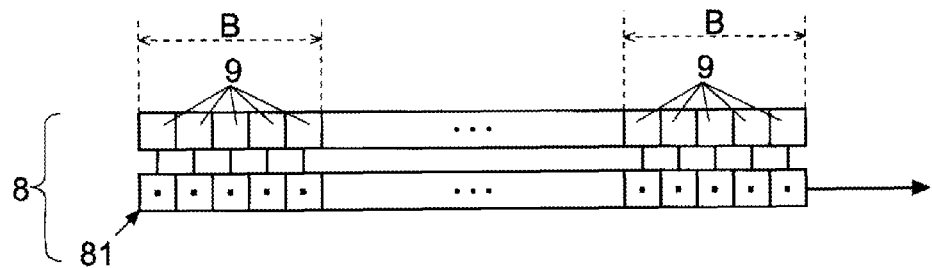
FIG. 3B is an illustrative view of one example of the structure of an image sensor.
Figure 4:
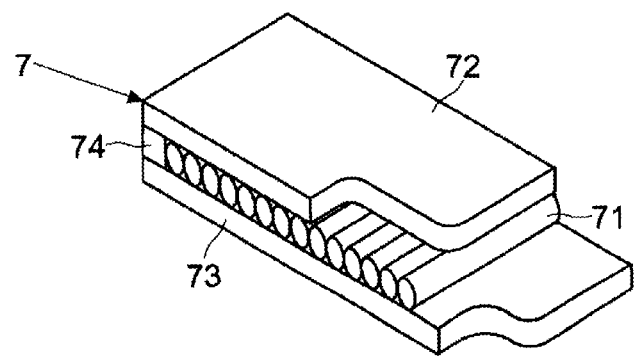
FIG. 4 is a perspective view of part of a rod lens array.

Next, each scanning unit 6 (first scanning unit 61 and second scanning unit 62) will be described with reference to FIGS. 3 and 4. FIG. 3A is a cross-sectional view of a scanning unit 6, and FIG. 3B is an illustrative view of one example of the structure of an image sensor 8. FIG. 4 is a perspective view of part of a rod lens array 7.

The multifunction peripheral 100 of this embodiment is installed with a first scanning unit 61 and a second scanning unit 62. The same type of scanning unit may be used for the first scanning unit 61 and the second scanning unit 62. Any part of the following description that applies to both the first scanning unit 61 and the second scanning unit 62 will omit the terms "first" and "second", referring to them generally as a scanning unit 6; and, for the sake of convenience, any members common to both the first scanning unit 61 and the second scanning unit 62 will be given the same numbering.

Each scanning unit 6 includes a housing 63 (external frame) with a roughly U-shaped cross section. The housing 63 is box-shaped, and a direction perpendicular to the surface of FIG. 3A is taken as the lengthwise direction thereof. The lengthwise direction of the housing 63 is the primary scanning direction of each scanning unit 6. A plate-shaped glass 64 is attached to an upper surface of the housing 63 so as to close the opening of the housing 63. A document passes by in contact with the glass 64 or near the glass 64 of the second scanning unit 62.

An image sensor 8 extending in a direction perpendicular to the surface of FIG. 3A (the primary scanning direction) is provided on an underside of the housing 63. The image sensor 8 has a plurality of light receiving elements 9 (photoelectric conversion elements) arranged in a row in the primary scanning direction. In each scanning unit 6 of this embodiment, the image sensor 8 is longer than the shorter side of an A3-sized sheet so as to allow tabloid-sized or A3-sized sheets to be scanned.

An example of the structure of the image sensor 8 will now be described with reference to FIG. 3B. The image sensor 8 has a plurality of light receiving elements 9 arranged in a row as pixels. The number and size of the light receiving elements 9 depends on the scanning resolution. For example, a readout resistor 81 is provided underneath each of the light receiving elements 9. The readout resistors 81 output the output of each of the light receiving elements 9 to the exterior in order at a constant clock speed.

A rod lens array 7 acting as a lens unit 65 is provided above the image sensor 8. The lens unit 65 of this embodiment has a plurality of rod lens arrays 7 joined (connected) together (described in detail hereafter).

A light guide 66 is provided next to the rod lens array 7. As shown by the dotted lines in FIG. 3A, a light source 67 (for example, an LED) is provided for each light guide 66 on an interior end of the housing 63 in a direction perpendicular with respect to the plane of the drawing. Each scanning unit 6 of this embodiment also has a light source 67 provided for each light guide 66 on a front end of the housing 63 in a direction perpendicular with respect to the plane of the drawing (front light source 67 not visible). Thus, two light sources 67 apiece (four altogether) are provided at each end of the housing 63 of the scanning unit 6 in the lengthwise direction.

The light guide 66 guides light generated by the light source 67 in the lengthwise direction (primary scanning direction) of each scanning unit 6. As shown by the double-dotted arrows in FIG. 3A, the light guide 66 emits light toward the area over the rod lens array 7 (above the glass 64) so as to yield a roughly even amount of light at each position along the lengthwise direction (primary scanning direction) of each scanning unit 6.

Each rod lens 71 included in the rod lens array 7 concentrates reflected light from among the light shined upon the document, and guides the reflected light to the image sensor 8

(the direction of the reflected light is shown by a double-dotted arrow). Next, the rod lens array 7 will be described with reference to FIG. 4. As shown in FIG. 4, the rod lens array 7 has rod lenses 71 (rod-shaped lenses) arrayed between two substrates 72 and 73 (made of, for example, resin). The rod lenses 71 are arranged in a row so that the peripheries thereof are in contact with each other. The rod lenses 71 each have the same lens length. The ends of the rod lenses 71 (upper and lower cylinder surfaces) are machined smooth. An endplate 74 is provided at the end of the two substrates 72 and 73.

(Hardware Configuration of Multifunction Peripheral 100)

Figure 5:
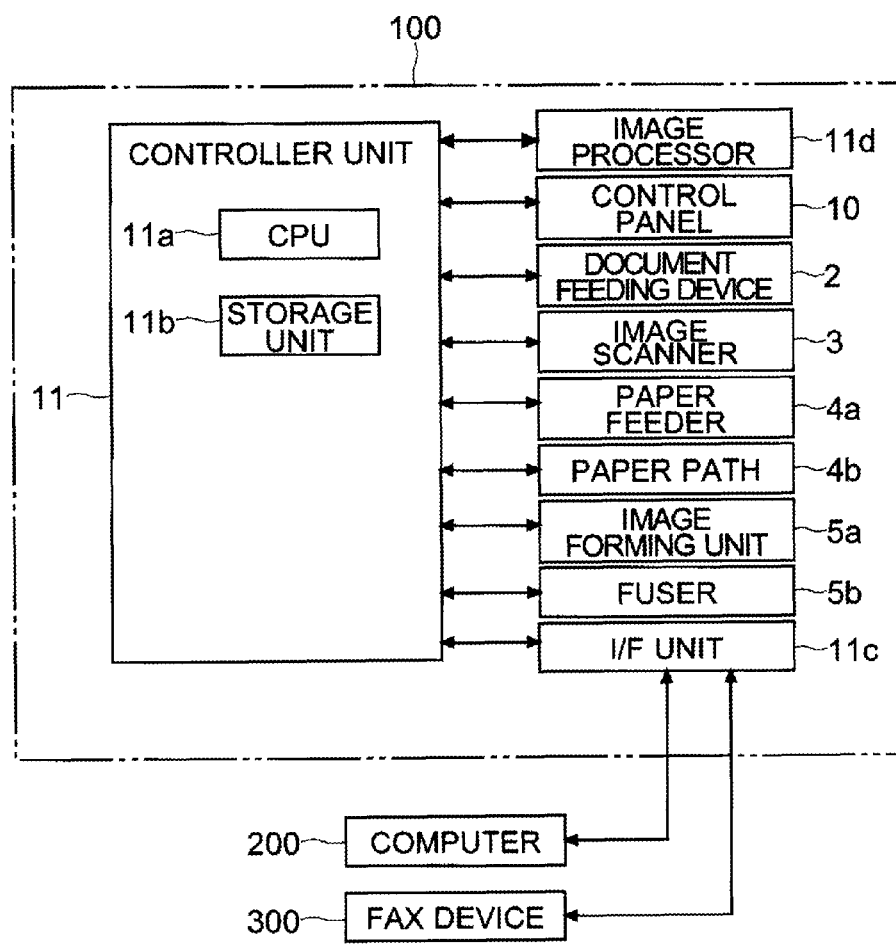
FIG. 5 is a block diagram showing one example of the hardware configuration of a multifunction peripheral.

Next, the hardware configuration of the multifunction peripheral 100 according to the first embodiment will be described with reference to FIG. 5. FIG. 5 is a block diagram showing one example of the hardware configuration of the multifunction peripheral 100.

As shown in FIG. 5, the multifunction peripheral 100 according to this embodiment has a controller unit 11 therein. The controller unit 11 is responsible for controlling the multifunction peripheral 100 as a whole. The controller unit 11 includes, for example, a CPU 11*a* and a storage unit 11*b*.

The CPU 11*a* is a central processing device that performs control and processing for each part of the multifunction peripheral 100 based on control programs stored in and retrieved from the storage unit 11*b*. The storage unit 11*b* comprises memory devices such as ROM, RAM, an HDD, flash ROM, and the like. The storage unit 11*b* stores control programs, control data, setting data, image data obtained by the image scanner 3, and the like for the multifunction peripheral 100.

The controller unit 11 is communicably connected with the image scanning device 1 (document feeding device 2 and/or image scanner 3), and the paper feeder 4*a*, feeding path 4*b*, image forming unit 5*a*, fuser 5*b*, control panel 10, and the like within the multifunction peripheral 100. The controller unit 11 controls the operation of each part based on the control programs and data stored within the storage unit 11*b* so that accurate proper image formation is performed.

The controller unit 11 is also connected to an I/F unit 11*c* provided with various connectors, sockets, communication control chips, and the like. The I/F unit 11*c* communicably connects the multifunction peripheral 100 to a computer 200 (for example, a PC or a server) or a corresponding FAX device 300, via a network, cable, public line, or the like. It is possible, for example, to send and receive image data including setting data (scanner function, FAX function) to and from an external computer 200 or corresponding FAX device 300 (including an internet FAX). It is also possible to store image data received from the external computer 200 or corresponding FAX device 300 in the storage unit 11*b*, as well as to print the data (printer function, FAX function).

(Hardware Configuration and Image Data Generation of an Image Scanning Device 1)

Figure 6:
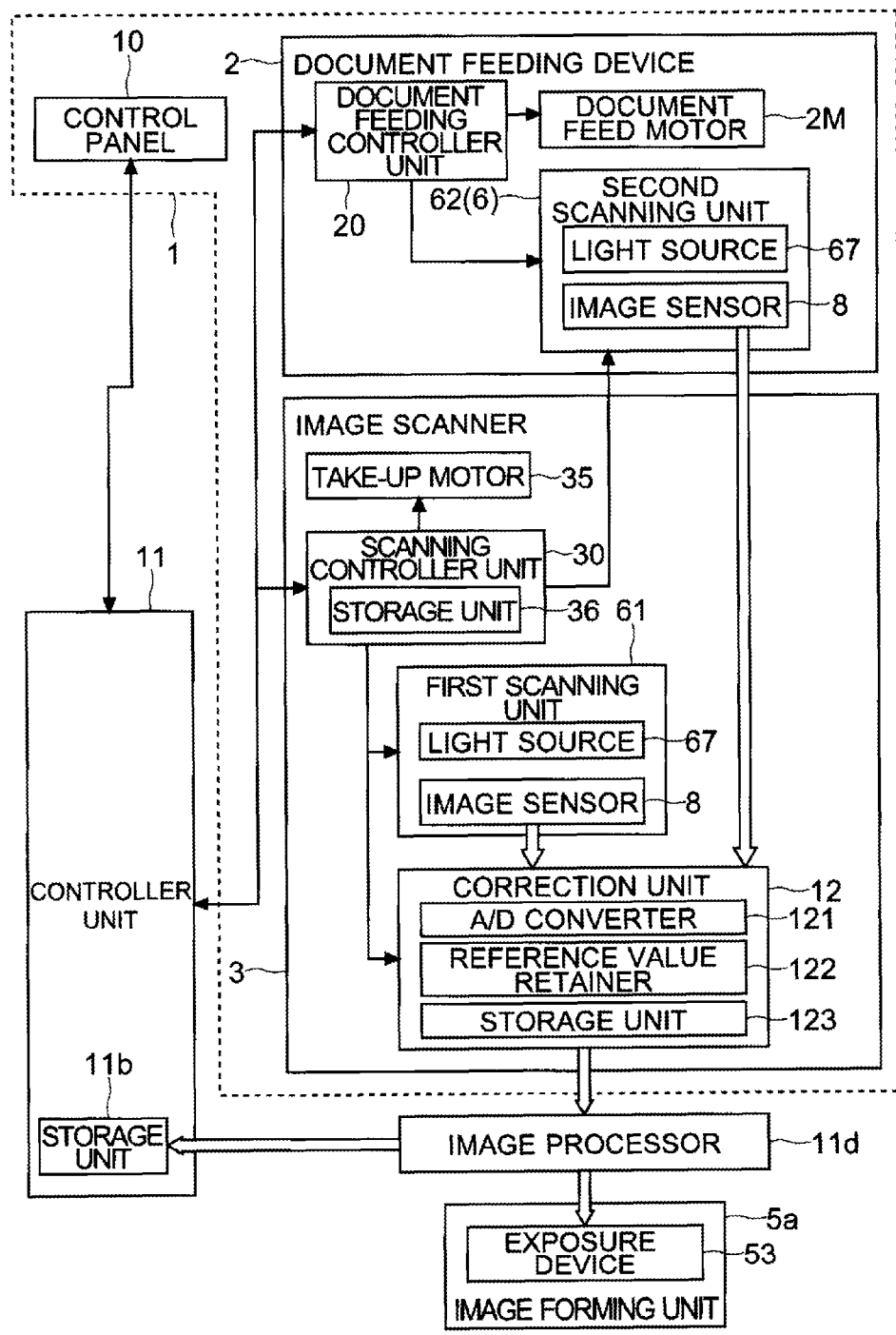
FIG. 6 is a block diagram showing one example of an image scanning device.

Next, the hardware configuration and image data generation of an image scanning device 1 according to the first embodiment will be described with reference to FIG. 6. FIG. 6 is a block diagram showing one example of an image scanning device 1. In FIG. 6, the flow of image data is represented by hollow white arrows.

The document feeding device 2, which is a part of the image scanning device 1, is provided with a document feeding controller unit 20. The document feeding controller unit 20 is communicably connected to the controller unit 11 of the multifunction peripheral 100 body. When performing scanning of the document using the document feeding device 2, such as when the START key 103 of the control panel 10 is pressed when a document has been placed upon the document tray 21, the controller unit 11 of the multifunction peripheral 100 body directs the document feeding controller unit 20 to feed the document. The document feeding controller unit 20 controls, for example, a document feed motor 2M or the like that causes the various rotating bodies that feed the document to rotate. The operation of the document feeding device 2 is thereby controlled.

The image scanner 3, which is a part of the image scanning device 1, is provided with a scanning controller unit 30. The scanning controller unit 30 is a substrate to which various electronics components such as a CPU, chips, and the like are attached. It is possible to provide a storage unit 36 within the scanning controller unit 30, for storing programs and data used for controlling by the scanning controller unit 30. The scanning controller unit 30 is communicably connected to the controller unit 11 of the multifunction peripheral 100 body. When performing scanning of a document, as for example when the START key 103 of the control panel 10 is pressed, the controller unit 11 of the multifunction peripheral 100 body directs the scanning controller unit 30 to scan the document.

When a document on the manual scanning contact glass 32 or the front surface of a document being fed by the document feeding device 2 is scanned, the scanning controller unit 30 operates the first scanning unit 61. Specifically, the scanning controller unit 30 illuminates the light source 67 of the first scanning unit 61 and drives the image sensor 8 of the first scanning unit 61. The scanning controller unit 30 also controls the take-up motor 35, which causes the take-up drum 34 to rotate. When the rear surface of a document being fed by the document feeding device 2 is scanned, the scanning controller unit 30 operates the second scanning unit 62 of the document feeding device 2. Specifically, the scanning controller unit 30 illuminates the light source 67 of the second scanning unit 62 and drives the image sensor 8 of the second scanning unit 62.

The output of each image sensor 8 of each scanning unit 6 is inputted into a correction unit 12. Rather than using a shared correction unit 12 for the first scanning unit 61 and the second scanning unit 62, a correction unit 12 for the first scanning unit 61 and a correction unit 12 for the second scanning unit 62 may be provided. Each of the light receiving elements 9 of each image sensor 8 performs photoelectric conversion on the reflected light, accumulating an electric charge corresponding to the level (amount) of reflected light, and releases the charge at a fixed timing. In other words, each of the light receiving elements 9 outputs an electrical current (voltage) corresponding to the intensity of the reflected light. Each image sensor 8 outputs an analog output value (for instance, a voltage value) for each of the light receiving elements 9 (pixel) to the correction unit 12. Depending on the circumstances, an amplifier for amplifying the electrical current (voltage) output of each of the light receiving elements 9 may be provided within or without each image sensor 8. In such a case, the correction unit 12 receives the amplified voltage value as an output value from each of the light receiving elements 9.

An A/D converter 121 of the correction unit 12 performs quantization according to the output value of each of the light receiving elements 9. In other words, the A/D converter 121 forms a pixel value indicating intensity for each pixel (light receiving element 9), and converts the analog output value for each of the light receiving elements 9 to digital data. In consideration of variations in the sensitivity of the light receiving elements 9 or uneven illumination of the document depending on the position along the primary scanning direction, a reference value retainer 122 storing a white reference value and a black reference value for each of the light receiving elements 9 of each scanning unit 6 for use during quantization is provided.

Next, the black reference value and white reference value used during quantization will be described. First, a process of obtaining a white reference value and a black reference value for the first scanning unit 61 will be described. The reference value retainer 122 obtains a black reference value and a white reference value for the first scanning unit 61 at times such as before scanning a document, after turning on the main power source, and reviving from power-saving mode.

In this embodiment, a black reference value for each of the light receiving elements 9 of the first scanning unit 61 is determined based on the output of the image sensor 8 when the light source 67 is unlit. In other words, the reference value retainer 122 obtains an output value (for example, a voltage value) for each of the light receiving elements 9 when the light source 67 is unlit, and takes the value as the black reference value for each of the light receiving elements 9. It is also possible to provide a black reference strip underneath the guide member 26, scan the black reference strip, and obtain a black reference value. To this end, the reference value retainer 122 has a circuit or element (for example, a chip having an A/D port) for detecting the voltage value (or current value) from each of the light receiving elements 9 of the image sensor 8. Specifically, the reference value retainer 122 obtains several lines of output values for each of the light receiving elements 9 when the light source 67 is unlit, averages the output values from each of the light receiving elements 9, and reduces the effects of noise to obtain a black reference value for each of the light receiving elements 9.

A white reference value for each of the light receiving elements 9 of the first scanning unit 61 is determined based on the output of the image sensor 8 when scanning a solid-white white reference strip 27 with the light source 67 lit. In other words, the reference value retainer 122 obtains an output value (for example, a voltage value or current value) for each of the light receiving elements 9 when the white reference strip 27 is scanned, and takes the value as the white reference value for each of the light receiving elements 9. Specifically, the reference value retainer 122 obtains several lines of output values for each of the light receiving elements 9 when the white reference strip 27 is scanned, averages the output values from each of the light receiving elements 9, and reduces the effects of noise to obtain a white reference value for each of the light receiving elements 9.

Next, a process of obtaining a white reference value and a black reference value for the second scanning unit 62 will be described. The reference value retainer 122 obtains a black reference value and a white reference value for the second scanning unit 62 at times such as before scanning, after turning on the main power source, and reviving from power-saving mode.

A black reference value for each of the light receiving elements 9 of the second scanning unit 62 is determined based on the output of the image sensor 8 when the light source 67 is unlit. In other words, the reference value retainer 122 obtains an output value (for example, a voltage value or current value) for each of the light receiving elements 9 when the light source 67 is unlit, and takes the value as the black reference value for each of the light receiving elements 9. Specifically, the reference value retainer 122 obtains several lines of output values for each of the light receiving elements 9 when the light source 67 is unlit, averages the output values from each of the light receiving elements 9, and reduces the effects of noise to obtain a black reference value for each of the light receiving elements 9.

A white reference value for each of the light receiving elements 9 of the second scanning unit 62 is determined based on the output of the image sensor 8 when the light source 67 is lit and a solid-white white reference roller 29 (see FIG. 2) provided in opposition to the second scanning unit 62 is scanned. In other words, the reference value retainer 122 obtains an output value (for example, a voltage value or current value) for each of the light receiving elements 9 when the white reference strip 27 is scanned, and takes the value as the white reference value for each of the light receiving elements 9. Specifically, the reference value retainer 122 obtains several lines of output values for each of the light receiving elements 9 when the white reference strip 27 is scanned, averages the output values from each of the light receiving elements 9, and reduces the effects of noise to obtain a white reference value for each of the light receiving elements 9.

The reference value retainer 122 imparts the A/D converter 121 with a white reference value and a black reference value for each pixel of each image sensor 8 of each scanning unit 6. The A/D converter 121 divides the range between the white reference value and the black reference value into a predetermined number of steps (gradations; for example, 256 8-bit gradations), and quantizes (gradates) each of the light receiving elements 9 (pixel) according to the size of the output value from the light receiving element 9 (pixel). For example, when the correction unit 12 outputs black-and-white image data, 8 bits per pixel (with, for example, 256 gradations, where black is 0 and white is 255) are outputted, and the value for each pixel becomes the intensity value. In the case of a color image, the correction unit 12 quantizes each pixel for red, green, and blue, for a total of 24 bits (for example, using a 256 gradient scale with a value of from 0 to 255 for red, green, and blue, with 8 bits for each). When the output value inputted to the correction unit 12 for each of the light receiving elements 9 does not fall within the range between the white reference value and the black reference value, the value is set, for example, at the maximum value (solid white; for example, 255 on a 256 gradient scale) or the minimum value (solid black; for example, 0) of the scale.

Image data for a document image outputted by the correction unit 12 is inputted to an image processor 11*d*. The image processor 11*d* of this embodiment is a circuit constituted by a combination of working RAM acting as a workspace for image data, a specialized ASIC, and the like. It is also possible to store an image processing program in the CPU 11*a* or storage unit 11*b* of the controller unit 11 to create a software-based image processor 11*d*. The image processor 11*d* is capable of performing various image processes such as intensity conversion, enlarging/shrinking, image data format conversion, and the like. Because the image processor 11*d* is capable of performing a wide range of imaging processes, it will be considered capable of performing known image processes for the purposes of the present disclosure, and detailed descriptions of imaging processes capable of being executed by the image processor 11*d* will be omitted.

The image data is sent to, for example, an exposure device 53 of the image forming unit 5*a* after being processed by the image processor 11*d*, and is used to scan/expose the photosensitive drum 51. It is thereby possible to perform printing based on a document (copy function). It is also possible, for example, to send the image data after being processed by the image processor 11*d* to the storage unit 11*b*, and to store the data in the storage unit 11*b* (scanner function).

(Joining Rod Lens Arrays 7)

Figure 7:
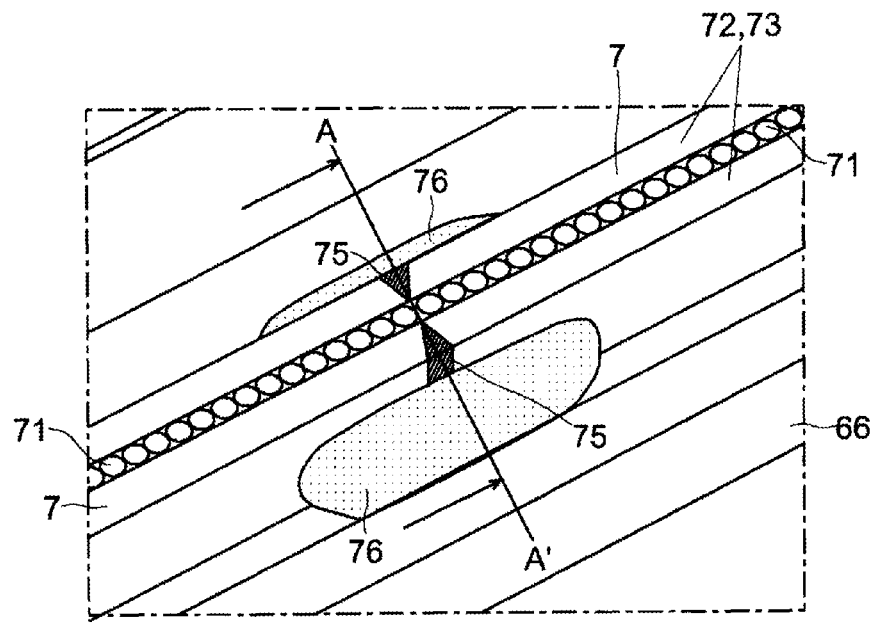
FIG. 7 is a magnified perspective view of a joint section between rod lens arrays.
Figure 8:
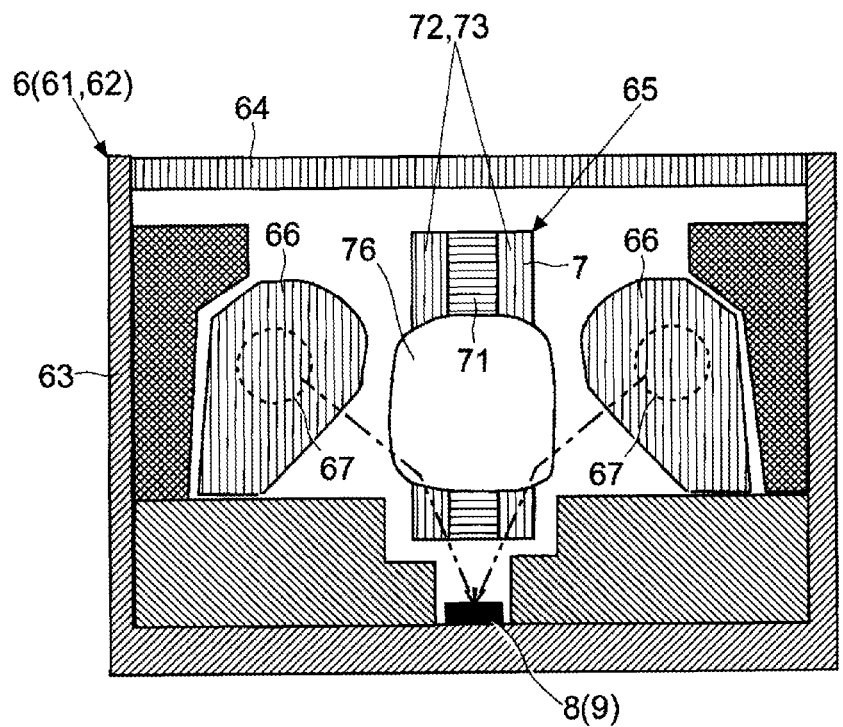
FIG. 8 is a cross-sectional view of a scanning unit showing a joint section between rod lens arrays.

Next, a process of joining rod lens arrays 7 in each scanning unit 6 according to the first embodiment will be described with reference to FIGS. 7 and 8. FIG. 7 is a magnified perspective view of a joint section between rod lens arrays 7. FIG. 8 is a cross-sectional view of a scanning unit 6 showing a joint section between rod lens arrays 7. FIG. 8 is a cross-sectional view of the scanning unit 6 as seen in the direction of an arrow along line A-A' in FIG. 7.

In order to be able to scan tabloid-size or A3-size sheets, the lengthwise direction length (primary scanning direction length) of the lens unit 65 of each scanning unit 6 of this embodiment is a length greater than the shorter side of a tabloid-size or A3-size sheet (approx. 300 to 310 mm)

The lens unit 65 of each scanning unit 6 of this embodiment has a plurality of rod lens arrays 7 joined together. For example, a rod lens array 7 (for convenience, referred to as rod lens array A) of a length roughly equal to the short side of an A4 sheet (approx. 220 to 230 mm) is first prepared. The end of the rod lens array A is cut, and a rod lens array 7 of approx. 80 mm length (for convenience, referred to as rod lens array B) is joined to the rod lens array A. In this way, a rod lens array 7 of a length corresponding to the length of the short side of a tabloid-size or A3-size sheet is obtained. The lens unit 65 of this embodiment has two rod lens arrays 7 joined together (connected). It is also possible to join three or more rod lens arrays and obtain a rod lens array 7 for use with each of the scanning units 6.

As shown in FIG. 7, a notch 75 is cut into an end of each rod lens array 7 constituting the lens unit 65. As also shown in FIG. 7, adhesive 76 is applied over the space between the rod lens arrays 7 so as to cover both substrates (side plates) 72 and 73. Each rod lens array 7 is thus connected and fixed in place by the adhesive 76. The adhesive 76 is, for example, a transparent UV-curing adhesive.

FIG. 8 is a cross-sectional view of an adhering (cut) surface of a rod lens array 7. As shown in FIG. 8, adhesive 76 is also applied to the rod lens 71 section. In order to connect and fix in place the rod lens arrays 7, the adhesive 76 is applied in roughly an H shape as seen from above.

Because a plurality of rod lens arrays 7 are joined together, gaps may form at the joints between the rod lens arrays 7. Formally speaking, the light path is: light source 67 (light guide 66)→document→rod lens 71→image sensor 8. However, when a gap is present, light from the light source 67 (light guide 66) intrudes through the gap into light receiving elements 9 positioned at the joints as ambient light (in FIG. 8, double-dotted arrows show one example of an ambient light path). This means that ambient light entering through the gaps increases the charge accumulated in the light receiving elements 9 situated at the joints. Even when, for example, the light receiving elements 9 receive the same amount of light reflected off of the document, the output values from light receiving elements 9 situated at the joints becomes larger than the output values from light receiving elements 9 not situated at the joints.

When this happens, the pixel values for pixels corresponding to light receiving elements 9 situated at joints in the image data formed by the correction unit 12 become brighter. For instance, given 256-gradient image data, when a document printed solid with the same color intensity throughout is scanned, the pixel values for pixels corresponding to light receiving elements 9 positioned at joints will on average be approximately 2 to 4 points greater (depending on the size of the gaps). Because the positions of the joints are fixed, when viewed in the secondary scanning direction, only the pixels corresponding to light receiving elements 9 positioned at joints are lighter, and appear as streaking (white streaks).

(Setting a Correction Value for Eliminating Streaking)

Figure 9:
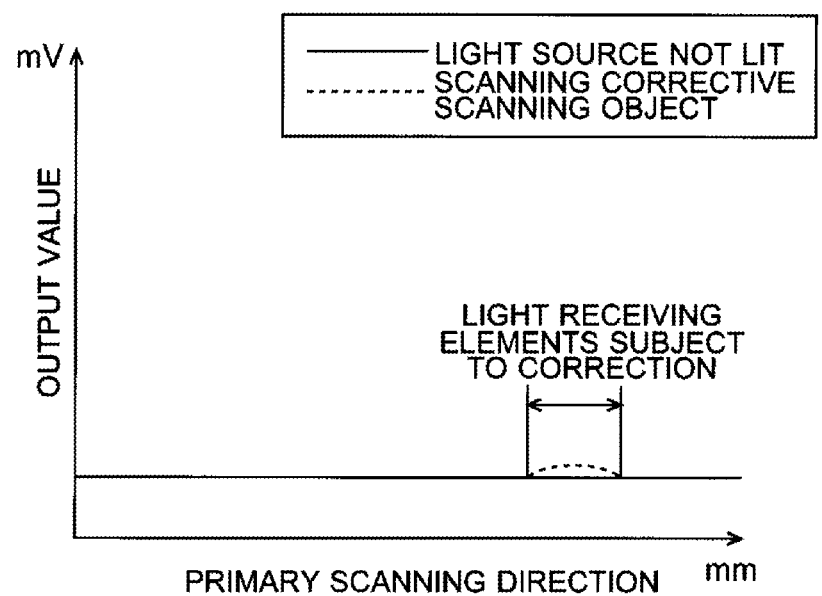
FIG. 9 is a conceptual graph describing correction for eliminating streaking.
Figure 10:
FIG. 10 is an illustrative view of one example of a correction scanning object for use in correction for eliminating streaking.
Figure 11:
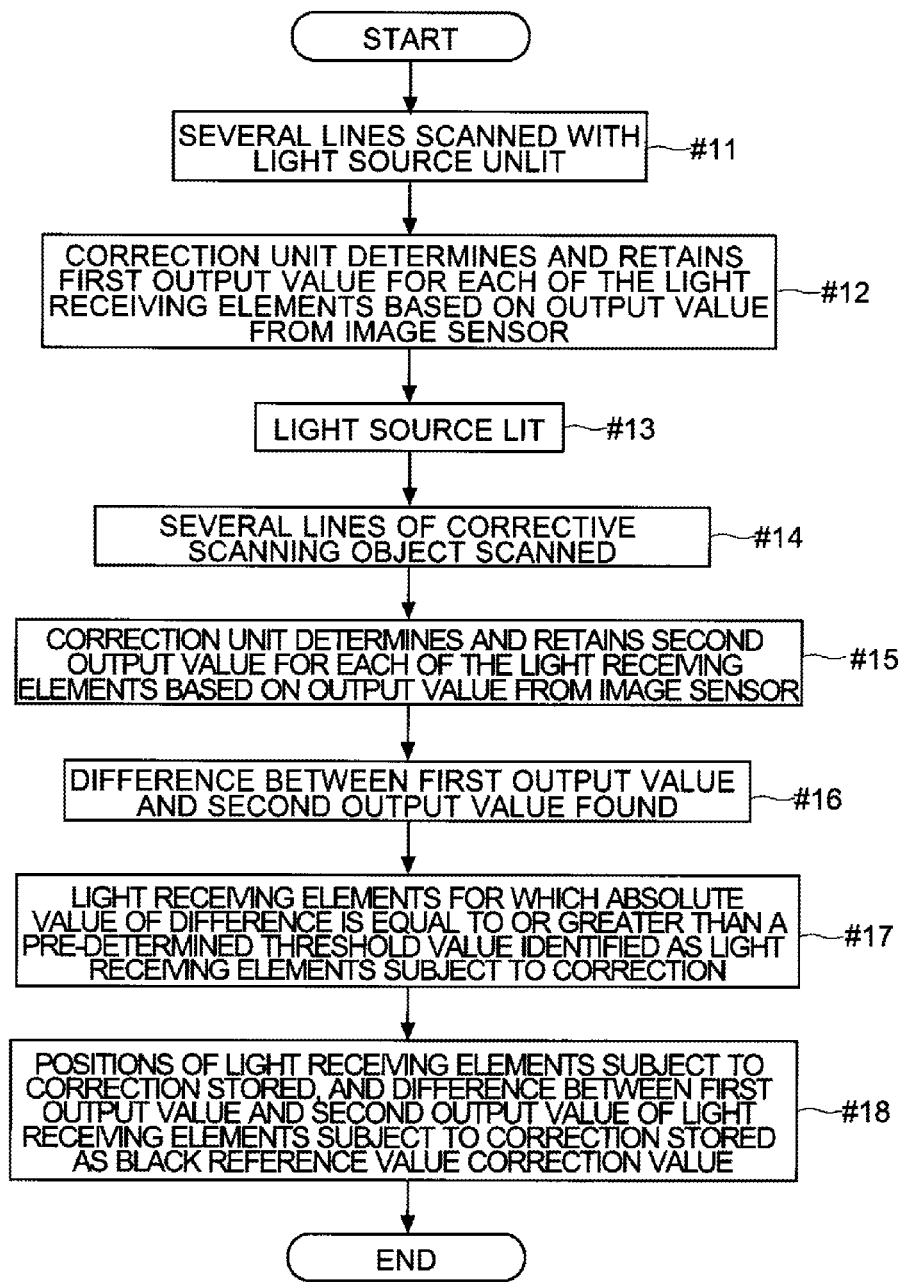
FIG. 11 is a flow chart showing one example of a process of setting a correction value for eliminating streaking.

Next, a process of setting a correction value for eliminating streaking according to the first embodiment will be described with reference to FIGS. 9 through 11. FIG. 9 is a conceptual graph describing correction for eliminating streaking. FIG. 10 is an illustrative view of one example of a correction scanning object for use in correction for eliminating streaking. FIG. 11 is a flow chart showing one example of a process of setting a correction value for eliminating streaking.

The effects of ambient light on the output value from the image sensor 8 will be described with reference to FIG. 9. FIG. 9 is a graph in which the X axis is the position of each of the light receiving elements 9 of the image sensor 8 along the primary scanning direction, and the Y axis is the output value from each of the light receiving elements 9.

The solid line in FIG. 9 shows one example of an output value from the image sensor 8 of each scanning unit 6 when several lines are scanned with the light source 67 unlit, and the average output value from each of the light receiving elements 9 is found. Because the light source 67 is unlit, at this time there are no effects of ambient light entering through the gaps between the rod lens arrays 7 on the output value from each of the light receiving elements 9. While the line showing the output value in FIG. 9 is a straight line, in actuality, there may be some degree of fluctuation due to the effects of noise and the like.

The dotted line in FIG. 9 shows one example of an output value from the image sensor 8 of each scanning unit 6 when several lines of a correction scanning object are scanned with the light source 67 lit, and the average output value from each of the light receiving elements 9 is found. In this example, a solid-black correction scanning object is used. As shown by the dotted line in FIG. 9, due to the effects of ambient light entering through the gaps between the rod lens arrays 7, the output value from a light receiving element 9 located at (corresponding to) a joint section between rod lens arrays 7 is greater than that of a light receiving element 9 located away from a joint section between rod lens arrays 7.

The correction scanning object used in this embodiment is a solid-black correction reference strip 28 (corresponding to a correction scanning object) or a correction document D (corresponding to a correction scanning object); a solid-black correction reference strip 28 can also be used as a black reference strip. In the first scanning unit 61, a black correction reference strip 28 is provided underneath the guide member 26 as a correction scanning object. In the second scanning unit 62, it is not impossible to provide a black correction reference strip 28 or a solid-black black reference roller, but it is necessary to switch between the white reference roller 29 and the correction reference strip 28 or solid-black black reference roller. As shown in FIG. 10, a solid-black correction document D is provided in advance as the correction scanning object. A black correction scanning object is set for the document feeding device 2, and the second scanning unit 62 is made to scan the correction scanning object. It is also possible to set a correction scanning object on the document feeding device 2 or manual scanning contact glass 32 of the first scanning unit 61 as well, and to scan the correction scanning object. Thus, a black correction document D can be used as a correction scanning object in the first scanning unit 61 as well.

As shown in FIG. 9, by comparing the output value from the image sensor 8 when the light source 67 is unlit and the output value from the image sensor 8 when the light source 67 is lit and the correction scanning object is scanned, the correction unit 12 is capable of identifying those light receiving elements 9 being affected by ambient light entering through joints between rod lens arrays 7. The correction unit 12 then considers the light receiving elements 9 so identified as light receiving elements 9 subject to correction, and corrects the black reference values thereof A process of setting a black reference value correction value for eliminating streaking will be described with reference to FIG. 11. "Start" within FIG. 11 is the point in time when the correction value for eliminating streaking caused by ambient light entering through gaps between rod lens arrays 7 is set. The correction value is set upon shipping out from the factory, or when performing maintenance upon the multifunction peripheral 100 after it has been installed. For example, the correction value can be set by inputting using the control panel 10.

First, the scanning controller unit 30 causes each scanning unit 6 to scan several lines with the light source 67 unlit (step #11). Next, based on the output values from the image sensor 8 of each scanning unit 6, the correction unit 12 averages the output values of each of the light receiving elements 9, determines a first output value for each of the light receiving elements 9, and retains the values in the reference value retainer 122 (step #12).

Next, the scanning controller unit 30 lights the light source 67 of each scanning unit 6 (step #13). The scanning controller unit 30 then causes each scanning unit 6 to scan several lines of the correction scanning object (step #14). After this scanning is complete, the light source 67 is extinguished. Based on the output values from the image sensor 8 of each scanning unit 6, the correction unit 12 averages the output values of each of the light receiving elements 9 of the image sensor 8, determines a second output value for each of the light receiving elements 9, and retains the values in the reference value retainer 122 (step #15).

Next, the correction unit 12 determines the difference between the first output value and second output value for each of the light receiving elements 9 of each scanning unit 6 (step #16). The difference may be found by subtracting the second output value from the first output value, or by subtracting the first output value from the second output value. The correction unit 12 then identifies those light receiving elements 9 wherein the absolute value of the difference so found is equal to or greater than a pre-determined threshold value as light receiving elements 9 subject to correction for each scanning unit 6 (step #17). The threshold value may be any desired value, but it is possible to set a difference between the first output value and the second output value such that streaking (white streaks) occurs when image data is formed as the threshold value. When the rod lens arrays 7 are connected with enough precision that there are no gaps, the correction unit 12 identifies no light receiving elements 9 as light receiving elements 9 subject to correction.

The storage unit (may be a storage unit 123 within the correction unit 12 or the storage unit 36 of the scanning controller unit 30) stores the positions of the light receiving elements 9 subject to correction, and the absolute value of the difference between the first output value and the second output value from the light receiving elements 9 subject to correction as a black reference value correction value for scanning, for each scanning unit 6 (step #18). The black reference value during scanning of the light receiving elements 9 subject to correction is corrected using this correction value.

(Scanning Using a Correction Value)

Figure 12:
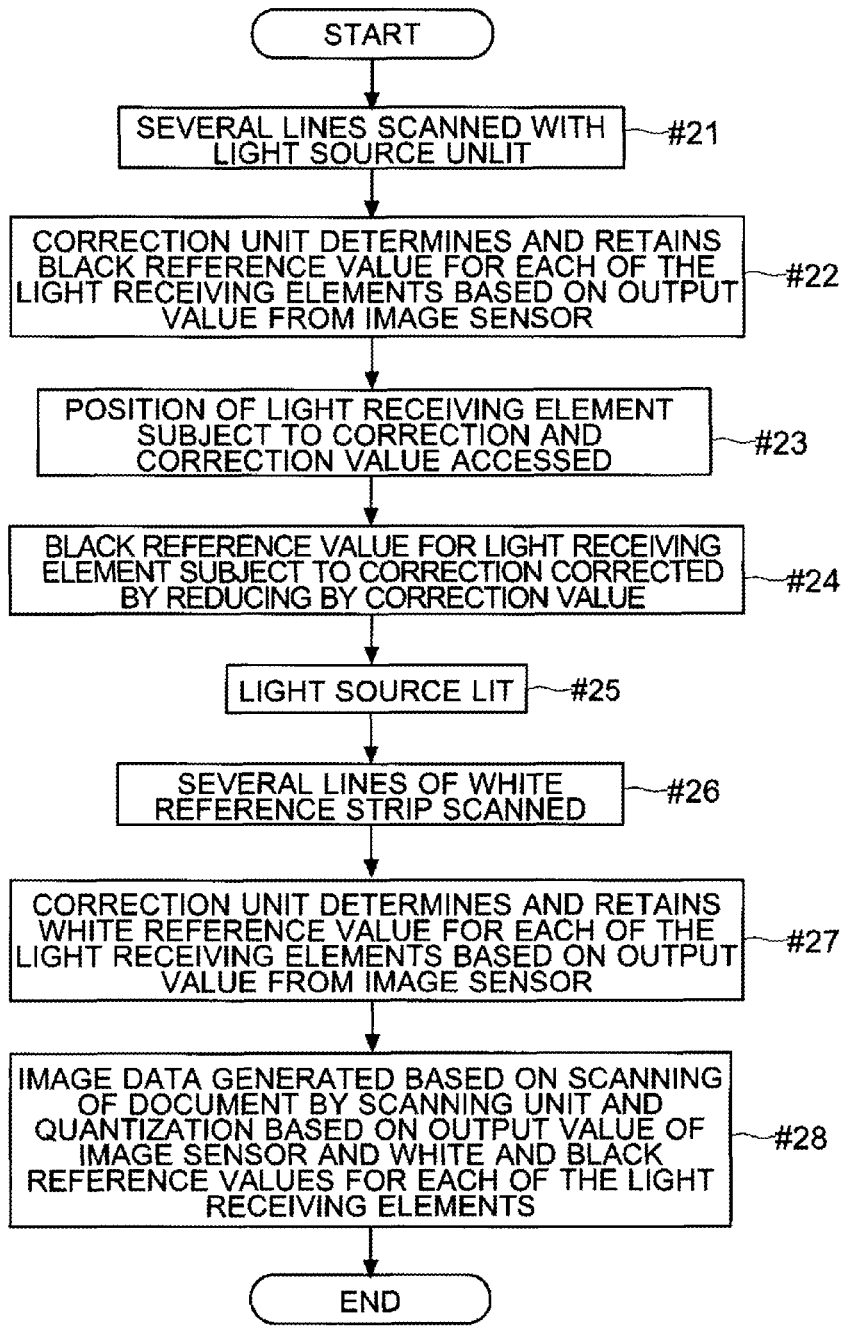
FIG. 12 is a flow chart showing one example of a process of scanning a document using a correction value.

Next, a process of scanning using a correction value according to the first embodiment will be described with reference to FIG. 12. FIG. 12 is a flow chart showing one example of a process of scanning a document using a correction value. The flow chart of FIG. 12 can be applied both to scanning using the first scanning unit 61 and scanning using the second scanning unit 62.

"Start" in FIG. 12 is the point in time where the white reference value and black reference value used during scanning are obtained. For example, before the START key 103 of the control panel 10 is pressed and document scanning begins (for each instance of document scanning), the image scanner 3 obtains a white reference value and a black reference value.

First, the scanning unit 6 scanning the document (either the first scanning unit 61, or both the first scanning unit 61 and the second scanning unit 62) scans several lines with the light source 67 unlit (step #21). Next, based on the output values from the image sensor 8 of each scanning unit 6, the correction unit 12 determines a black reference value for each of the light receiving elements 9 by averaging the output values of each of the light receiving elements 9, and retains the values in the reference value retainer 122 (step #22).

The correction unit 12 reads out the position of the light receiving elements 9 subject to correction and the correction value from the storage unit (storage unit 36 or storage unit 123) (step #23). The correction unit 12 then corrects the black reference value for the light receiving elements 9 subject to correction by reducing the reference value by the amount of the correction value (step #24). In other words, the range between the black reference value and the white reference value are expanded, and the effects of ambient light entering from the gaps between rod lens arrays 7 on the light receiving elements 9 subject to correction are reduced.

Next, the scanning controller unit 30 lights the light source 67 of the scanning unit 6 scanning the document (step #25). The scanning controller unit 30 then causes the scanning unit 6 scanning the document to scan several lines of the white reference strip 27 (step #26). After this scanning is complete, the light source 67 is extinguished. Based on the output values from the image sensor 8 of each scanning unit 6, the correction unit 12 determines a white reference value for each of the light receiving elements 9 of the image sensor 8 by averaging the output values of each of the light receiving elements 9, and retains the values in the reference value retainer 122 (step #27).

After the black reference value and white reference value have been obtained, quantization based on the output value of the image sensor 8 and the white reference value and black reference value of each of the light receiving elements 9, obtained from the scanning of the document by the scanning unit 6 and from the A/D converter 121 of the correction unit 12, is performed for one or a plurality of document sheets, and image data is generated (step #28→End). Afterwards, the image data is provided to the exposure device 53 and the like and used as necessary. In this way, the black reference value is corrected, and streak-free image data is generated.

As described above, the image scanning device 1 of this embodiment has an image sensor 8 including an array of a plurality of light receiving elements 9; a light source 67 for shining light upon a scanning object; a lens unit 65 for guiding reflected light from a scanning object to the image sensor 8 and having a plurality of rod lens arrays 7, in which a plurality of rod lenses 71 are arrayed, joined together; and a correction unit 12 for correcting the pixel values of pixels corresponding to positions of joints between rod lens arrays 7 in image data generated based on the output values from the light receiving elements 9 of the image sensor 8 so that the pixel values become darker.

The correction performed in the image scanning device 1 described in this embodiment can also be considered a method for correcting the pixel values of pixels corresponding to the positions of joints between rod lens arrays. Specifically, in the method for correcting the pixel values of pixels corresponding to the positions of joints between rod lens arrays in the image scanning device 1 of this embodiment, a light source 67 shines light upon a scanning object; a lens unit 65, in which a plurality of rod lens arrays 7 having an array of a plurality of rod lenses 71 are joined together, guides light reflected off the scanning object to an image sensor 8 having an array of a plurality of light receiving elements 9; and the pixel values of pixels corresponding to the positions of joints between rod lens arrays 7 in image data generated based on the output values from each of the light receiving elements 9 of the image sensor 8 are corrected.

It is thereby possible to eliminate the effects of ambient light on the image data even when ambient light other than light reflected off of the document enters into the image sensor 8 through the gaps between joints between rod lens arrays 7. Thus, it is possible to obtain image data that is free of streaking (white streaks), even when the rod lens arrays 7 are connected with a transparent adhesive 76, or when not all gaps are filled with a sealant, allowing ambient light to enter through the gaps between the joints between rod lens arrays 7.

Based on the size of the output values from each of the light receiving elements 9, the correction unit 12 performs quantization in which the output values are converted into pixel values falling in a range between a black reference value and a white reference value, generates digital image data from the output of the image sensor 8, and corrects the black reference value of the light receiving elements 9 subject to correction, which are those light receiving elements 9 corresponding to the positions of joints between rod lens arrays 7. It is thereby possible to darken those pixels in the image data corresponding to the light receiving elements 9 subject to correction by correcting the black reference, which indicates the minimum output value level for the light receiving elements 9 during quantization. In other words, because the black reference value is corrected, the pixel values of the light receiving elements 9 subject to correction in the image data are corrected so that the pixel values become darker at increased color intensities, at which the effects of ambient light are more prominent, and the effects of correction upon the pixel values are reduced at lower color intensities, at which the effects of ambient light are less prominent. Thus, it is possible to perform correction according to color intensity (pixel value) so as to smoothly cancel out increases in the output values from the light receiving elements 9 due to the effects of ambient light.

The correction unit 12 obtains a first output value for each of the light receiving elements 9 when the light source 67 is unlit and a second output value for each of the light receiving elements 9 when a pre-prepared correction scanning object (correction reference strip 28 or correction document D) of a uniform color intensity is scanned, determines the difference between the first output value and the second output value for each of the light receiving elements 9, identifies those light receiving elements 9 for whom the absolute value of the difference is equal to or greater than a threshold value as light receiving elements 9 subject to correction, and corrects the black reference value for the light receiving elements 9 subject to correction. It is thereby possible to detect and identify joints between rod lens arrays 7 simply by obtaining output values for each of the light receiving elements 9 when the light source 67 is unlit and scanning the correction scanning object.

The image scanning device 1 of this embodiment also has a storage unit (storage unit 36, storage unit 123, or the like) for storing data; the correction scanning object (correction reference strip 28 or correction document D) is black; the storage unit stores the positions of the light receiving elements 9 subject to correction and the absolute value of the difference between the first output value and second output value of each of the light receiving elements 9 subject to correction as a correction value; and the correction unit 12 determines the black reference value of each of the light receiving elements 9 based on the output value from each of the light receiving elements 9 when the light source 67 is unlit, and performs correction by reducing the black reference values of the light receiving elements 9 subject to correction by the amount of the correction values. As a consequence thereof, only the black reference value is reduced by correction, and quantization is performed along a larger range between the black reference value and the white reference value, so that the output values of the light receiving elements 9 subject to correction are quantized so as to become darker overall than before correction. The storage unit stores the positions and correction values of the light receiving elements 9 subject to correction. Because the positions of the joints between rod lens arrays 7 are fixed, it is possible thereby to constantly perform correction eliminating the effects of ambient light simply by scanning a black correction scanning object one time.

The correction scanning object (correction reference strip 28 or correction document D) is a document of a uniform color intensity, or a reference strip provided at a position capable of being scanned by the image sensor 8. It is thereby possible to perform correction eliminating the effects of ambient light in various forms of image scanning device 1 having an contact image sensor unit.

The image forming device also includes an image scanning device 1. According to this configuration, it is possible to obtain image data free of streaking (white streaks) even when the image scanning device 1 has a connected plurality of rod lens arrays 7. Thus, it is possible to provide an image forming device that is capable of printing a printed object free of streaking (white streaks) caused by ambient light entering through the gaps between rod lens arrays 7, and that provides printed objects of high printing quality.

(Second Embodiment)

Figure 13:
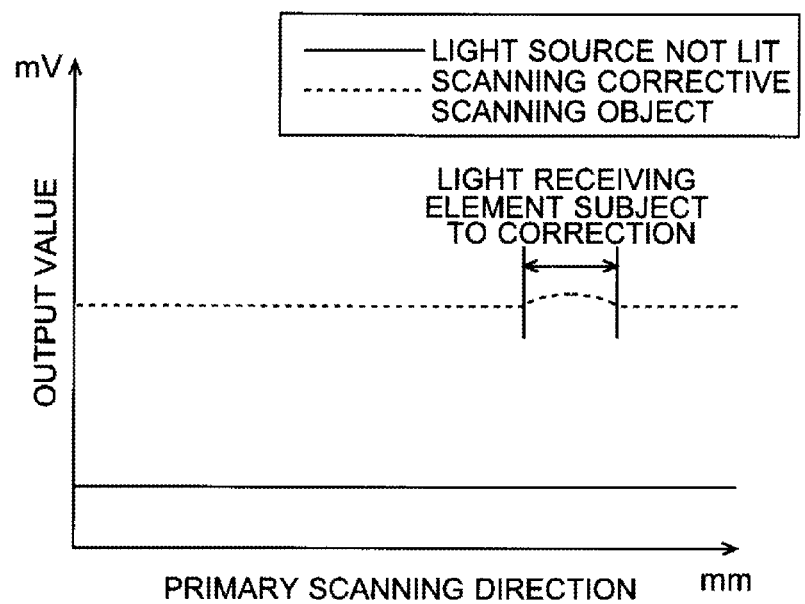
FIG. 13 is a conceptual graph describing correction for eliminating streaking.
Figure 14:
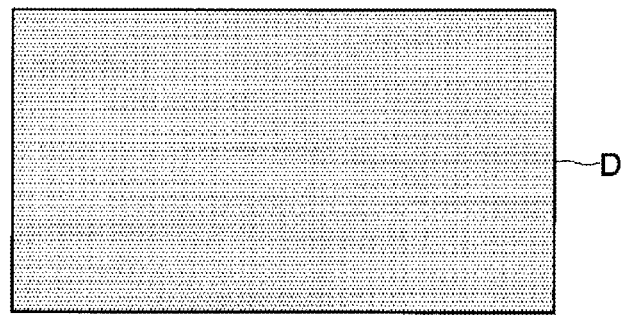
FIG. 14 is an illustrative view of one example of a correction scanning object for use in correction for eliminating streaking.
Figure 15:
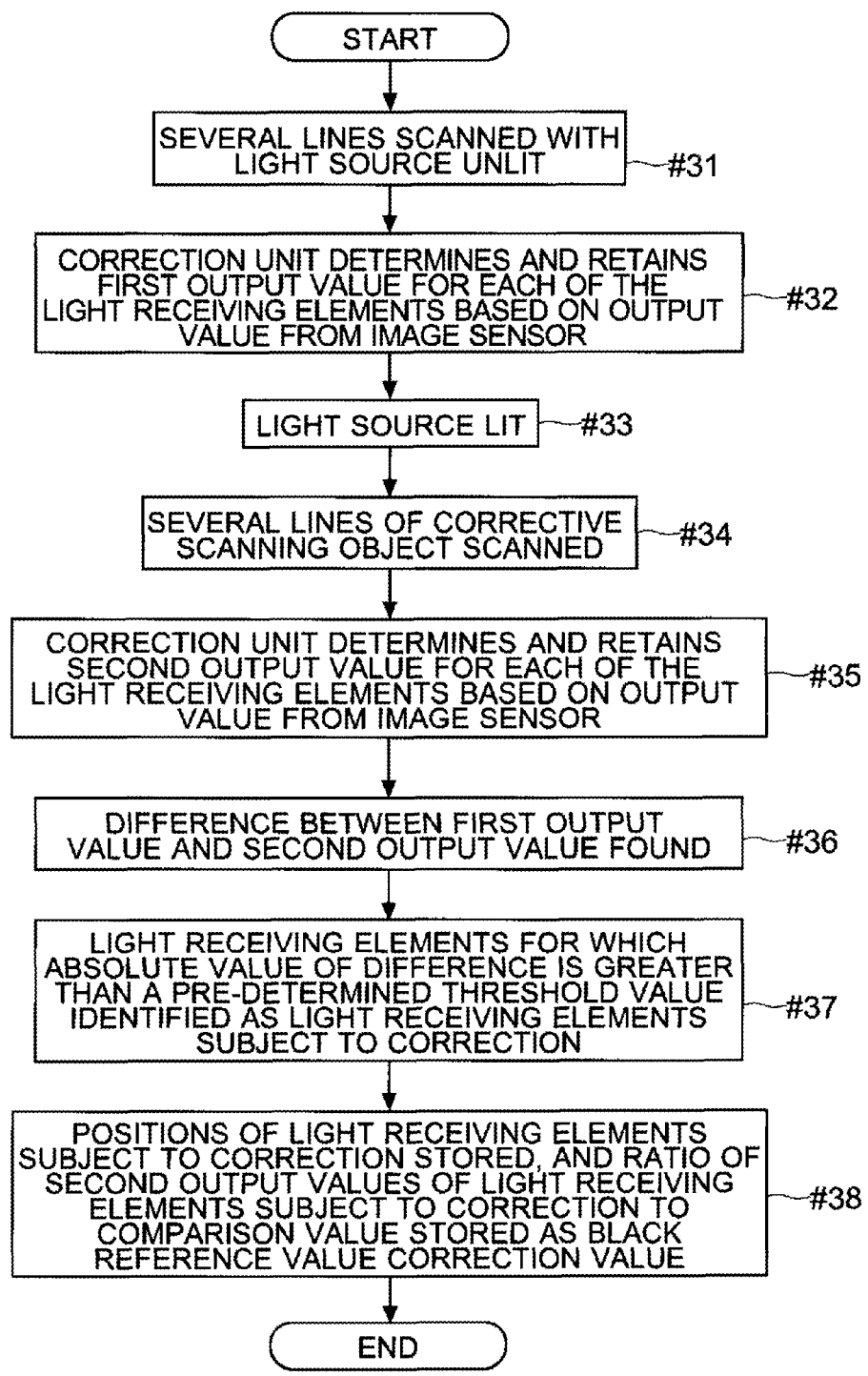
FIG. 15 is a flow chart showing one example of a process of setting a correction value for eliminating streaking.
Figure 16:
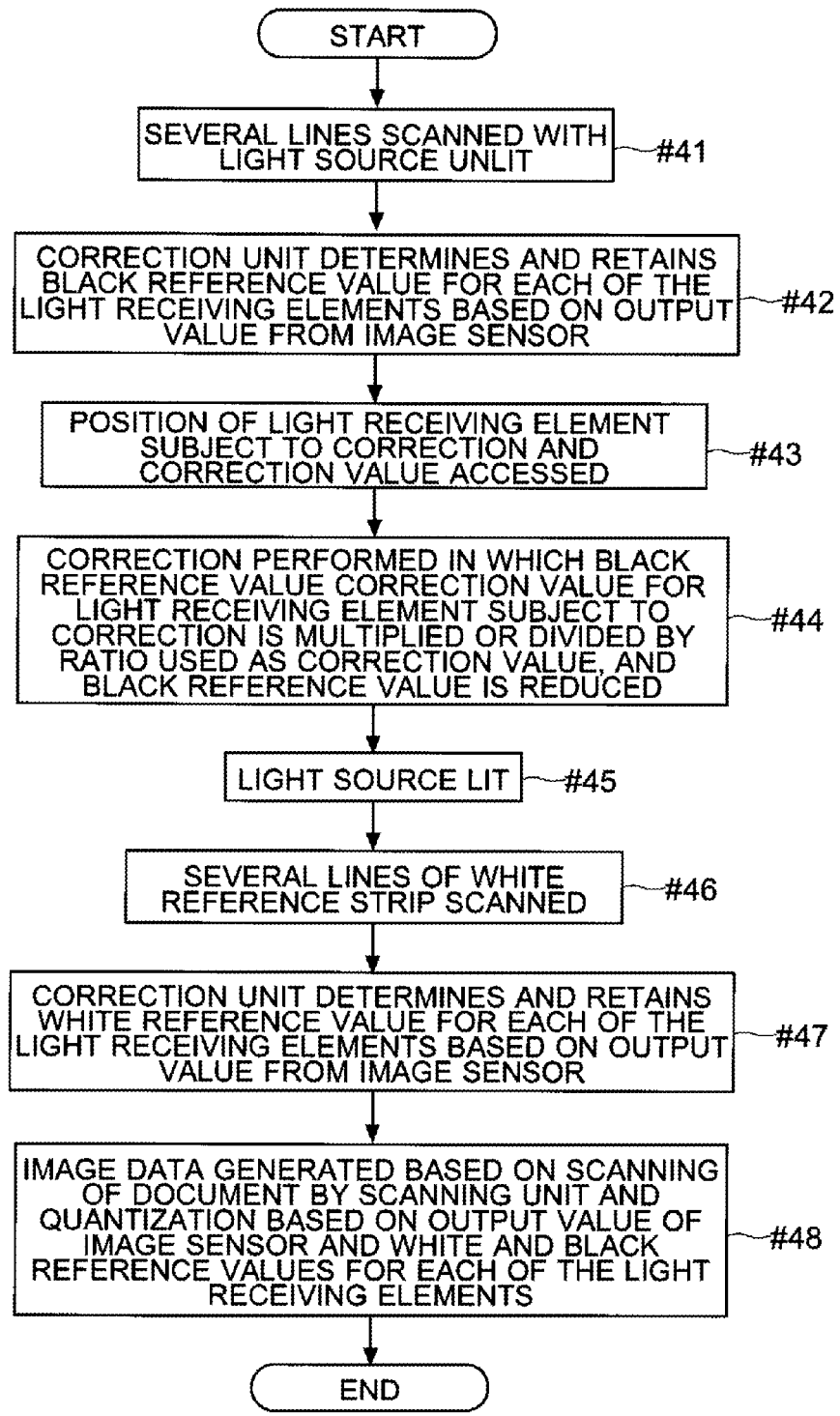
FIG. 16 is a flow chart showing one example of a process of scanning a document using a correction value.

Next, a process of setting a correction value for eliminating streaking according to a second embodiment will be described with reference to FIGS. 13 through 16. FIG. 13 is a conceptual graph describing correction for eliminating streaking. FIG. 14 is an illustrative view of one example of a correction scanning object for use in correction for eliminating streaking. FIG. 15 is a flow chart showing one example of a process of setting a correction value for eliminating streaking. FIG. 16 is a flow chart showing one example of a process of scanning a document using a correction value.

The second embodiment differs from the first embodiment in that a correction scanning object that is not solid black is scanned to set a correction value for eliminating streaking. With regard to other points, the second embodiment may be similar to the first embodiment, and will be considered to incorporate the description of the first embodiment, with any description or drawings of any parts in common being omitted.

FIG. 13 is a graph similar to that of FIG. 9, which was used in describing the first embodiment. The solid line in FIG. 13 shows one example of output values from the image sensors 8 of each of the scanning unit 6 when several lines are scanned with the light source 67 unlit and the average output value from each of the light receiving elements 9 is found.

In this embodiment, a correction scanning object of a color other than black is used. For example, the correction scanning object of this embodiment is a correction reference strip 28 of a gray of uniform intensity or a gray correction document D (the object may also be colored). A white reference strip or document is not used for the correction scanning object. For instance, the first scanning unit 61 is provided with a correction reference strip 28 of a deep gray color underneath the guide member 26 (see FIG. 2). The second scanning unit 62 is provided in advance with a correction document D of a deep color (for example, gray), as shown in FIG. 14. The correction scanning object is set in the document feeding device 2, and the second scanning unit 62 is made to scan the correction scanning object. It is also possible to set the correction scanning object on the document feeding device 2 or manual scanning contact glass 32 of the first scanning unit 61 as well, and to scan the correction scanning object. Thus, a gray correction document D can be used as a correction scanning object in the first scanning unit 61 as well.

The dotted line in FIG. 13 shows one example of an output value from the image sensor 8 of each scanning unit 6 when several lines of a correction scanning object are scanned with the light source 67 lit, and the average output value from each of the light receiving elements 9 is found. As shown by the dotted line in FIG. 13, due to the ambient light entering through the gaps between the rod lens arrays 7, the output value from a light receiving element 9 located at (corresponding to) a joint section between rod lens arrays 7 is greater than that of a light receiving element 9 located away from any joint section between rod lens arrays 7.

As shown in FIG. 13, by comparing the output value from the image sensor 8 when the light source 67 is unlit and the output value from the image sensor 8 when the light source 67 is lit and the correction scanning object is scanned, the correction unit 12 is capable of identifying those light receiving elements 9 being affected by ambient light entering through joints between rod lens arrays 7. The correction unit 12 then considers the light receiving elements 9 so identified as light receiving elements 9 subject to correction, and corrects the black reference values thereof A process of setting a black reference value correction value for eliminating streaking in the second embodiment will be described with reference to FIG. 15. As in the case of the first embodiment, "START" in FIG. 15 is the point in time when the correction value for eliminating streaking caused by ambient light entering in through the gaps between rod lens arrays 7 is set upon shipping out from the factory.

First, the scanning controller unit 30 causes each scanning unit 6 to scan several lines with the light source 67 unlit (step #31). Next, based on the output values from the image sensor 8 of each scanning unit 6, the correction unit 12 averages the output values of each of the light receiving elements 9, determines a first output value for each of the light receiving elements 9, and retains the values in the reference value retainer 122 (step #32).

Next, the scanning controller unit 30 lights the light source 67 of each scanning unit 6 (step #33). The scanning controller unit 30 then causes each scanning unit 6 to scan several lines of the correction scanning object, which is, for example, gray in color (step #34). After this scanning is complete, the light source 67 is extinguished. Based on the output values from the image sensor 8 of each scanning unit 6, the correction unit 12 averages the output values of each of the light receiving elements 9 of the image sensor 8, determines a second output value for each of the light receiving elements 9, and retains the values in the reference value retainer 122 (step #35).

Next, the correction unit 12 determines the difference between the first output value and second output value for each of the light receiving elements 9 of each scanning unit 6 (step #36). The correction unit 12 then identifies those light receiving elements 9 wherein the absolute value of the difference so found is equal to or greater than a pre-determined threshold value as light receiving elements 9 subject to correction, for each scanning unit 6 (step #37). The threshold value may be any desired value, but it is possible to set a difference in output values such that streaking (white streaks) occurs when image data is formed as the threshold value. When fellow rod lens arrays 7 are connected with enough precision that there are no gaps, the correction unit 12 identifies no light receiving elements 9 as light receiving elements 9 subject to correction.

The storage unit (may be the storage unit 123 within the correction unit 12 or the storage unit 36 of the scanning controller unit 30) stores for each scanning unit 6 the positions of the light receiving elements 9 subject to correction, and the ratio of the second output value from the light receiving elements 9 subject to correction to a comparison value, based on a second output value from a light receiving element 9 that is not one of the light receiving elements 9 subject to correction, as a black reference value correction value for scanning (step #38). The comparison value based on the second output value from the light receiving element 9 that is not one of the light receiving elements 9 subject to correction may be the average second output value from the light receiving element 9 that is not one of the light receiving elements 9 subject to correction, or may be the second output value of an arbitrarily selected light receiving element 9 subject to correction. Through this, the ratio is used to correct the black reference value of the light receiving elements 9 subject to correction during subsequent scannings. The ratio is calculated by the correction unit 12 (or by the scanning controller unit 30).

Next, a process of scanning using a correction value according to the second embodiment will be described with reference to FIG. 16. FIG. 16 is a flow chart showing one example of a process of scanning a document using a correction value. The flow chart of FIG. 16 can be applied both to scanning using the first scanning unit 61 and scanning using the second scanning unit 62.

"Start" in FIG. 16 is the point in time where the white reference value and black reference value used during scanning are obtained. For example, before the START key 103 of the control panel 10 is pressed and document scanning begins (for each instance of document scanning), a white reference value and a black reference value are obtained.

First, the scanning unit 6 scanning the document scans several lines with the light source 67 unlit (step #41). Next, based on the output values from the image sensor 8 of each scanning unit 6, the correction unit 12 determines a black reference value for each of the light receiving elements 9 by averaging the output values of each of the light receiving elements 9, and retains the values in the reference value retainer 122 (step #42).

The correction unit 12 reads out the positions of the light receiving elements 9 subject to correction and the correction value from the storage unit (storage unit 36 or storage unit 123) (step #43). The correction unit 12 further performs correction reducing the black reference value of the light receiving elements 9 subject to correction by multiplying or dividing the black reference value by the ratio as a correction value (step #44). In other words, the range between the black reference value and the white reference value is expanded, and the effects of ambient light entering from the gaps between rod lens arrays 7 on the light receiving elements 9 subject to correction are lessened.

When, for example, the correction unit 12 determines the ratio as (second output value from the light receiving element 9 subject to correction : comparison value), the ratio is greater than one because the second output value from the light receiving element 9 subject to correction is larger. In this case, the correction unit 12 divides the black reference value by the ratio and reduces the black reference value. On the other hand, when the correction unit 12 determines the ratio as (comparison value:second output value from the light receiving element 9 subject to correction), the ratio is less than one because the second output value from the light receiving element 9 subject to correction is larger. In this case, the correction unit 12 multiplies the black reference value by the ratio and reduces the black reference value.

As steps #45 through #48 are similar to the steps #25 through #28 of FIG. 12 mentioned in the description of the first embodiment, a description thereof will be omitted.

As described above, the image scanning device 1 of this embodiment has a storage unit (storage unit 36, storage unit 123, or the like) for storing data; the correction scanning object (correction reference strip 28 or correction document D) is gray or colored and has a uniform intensity; the correction unit 12 determines the ratio of the second output values from the light receiving elements 9 subject to correction to a comparison value based on the second output value from a light receiving element 9 that is not one of the light receiving elements 9 subject to correction; the storage unit stores the position and ratio of each of the light receiving elements 9 subject to correction; and the correction unit 12 determines the black reference value of each of the light receiving elements 9 based on the output value from each of the light receiving elements 9 when the light source 67 is unlit, and performs correction reducing the black reference value of the light receiving elements 9 subject to correction by multiplying or dividing the black reference value by the ratio. It is thereby possible to properly correct the black reference value of the light receiving elements 9 subject to correction even when the correction scanning object is not black. The storage unit stores the positions and ratios of the light receiving elements 9 subject to correction. Because the positions of the joints between rod lens arrays 7 are fixed, it is possible through this to constantly perform correction eliminating the effects of ambient light simply by scanning a correction scanning object one time.

(Third Embodiment)

Figure 17:
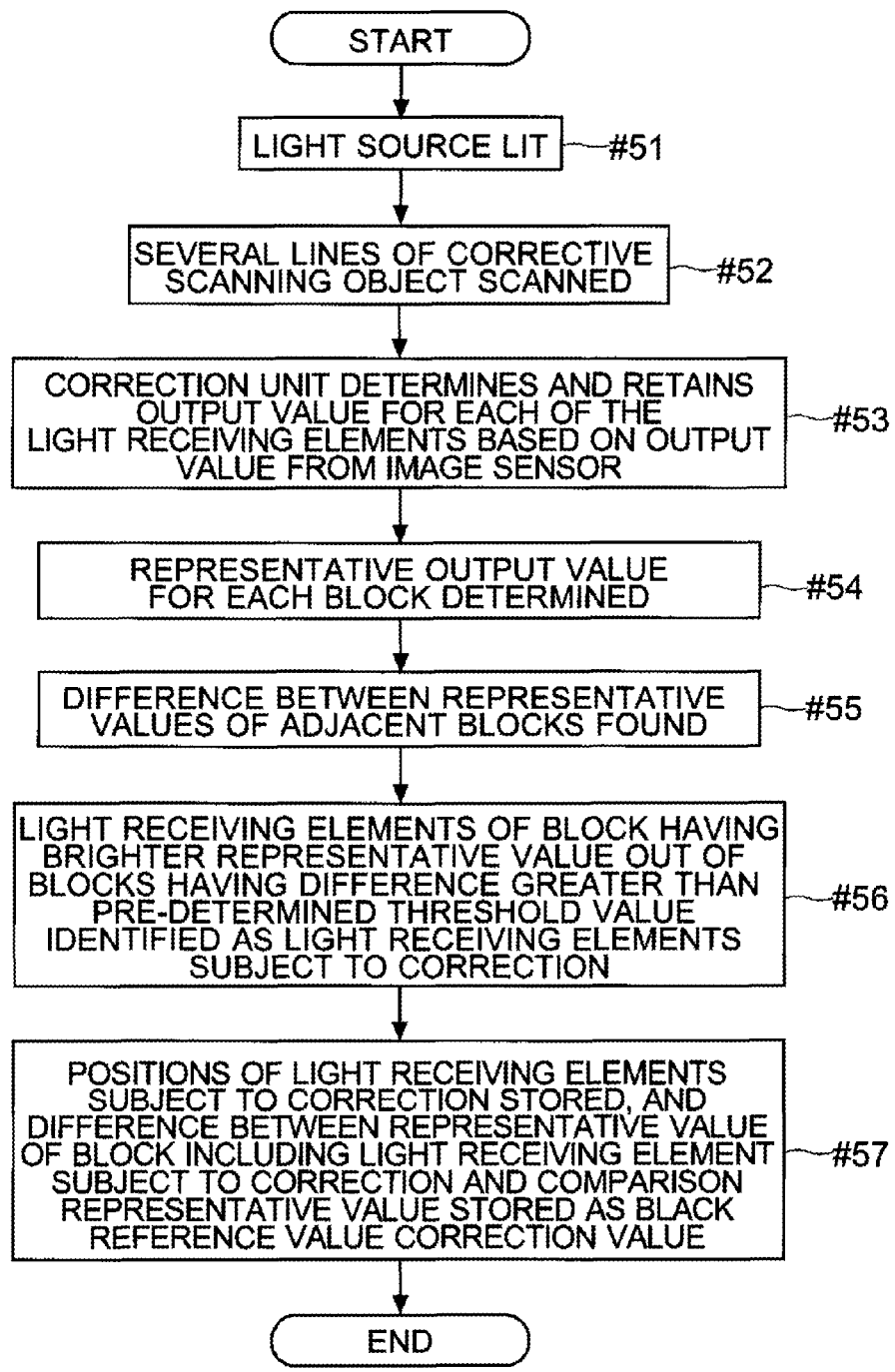
FIG. 17 is a flow chart showing one example of a process of setting a correction value for eliminating streaking.

Next, a process of setting a correction value for eliminating streaking according to a third embodiment will be described with reference to FIG. 17. FIG. 17 is a flow chart showing one example of a process of setting a correction value for eliminating streaking.

This embodiment differs from the first and second embodiments in that light receiving elements 9 affected by ambient light entering through the joints between rod lens arrays 7 are identified simply by scanning a correction scanning object, and the black reference value of the light receiving elements 9 subject to correction identified by the correction unit 12 is corrected. With regard to other points, the third embodiment may be similar to the first and second embodiments, and will be considered to incorporate the description of the first and second embodiments, with any description or drawings of any parts in common being omitted.

The correction scanning object used in this embodiment is a solid-black correction reference strip 28 or correction document D; the solid-black correction reference strip 28 can also be used as a black reference strip. In the first scanning unit 61, a black correction reference strip 28 is provided underneath the guide member 26 as a correction scanning object. As shown in FIG. 10, the second scanning unit 62 is provided in advance with a solid-black correction document D as the correction scanning object. A black correction scanning object is set in the document feeding device 2, and the second scanning unit 62 is made to scan the correction scanning object. It is also possible to set a correction scanning object on the document feeding device 2 or manual scanning contact glass 32 of the first scanning unit 61 as well, and to scan the correction scanning object. Thus, a black correction document D can be used as a correction scanning object in the first scanning unit 61 as well.

As described in the case of the first embodiment using FIG. 9, the output value of the image sensor 8 from scanning the correction scanning object increases in light receiving elements 9 affected by ambient light entering through joints between rod lens arrays 7. In this embodiment, the light receiving elements 9 of the image sensor 8 are divided into a plurality of blocks B (see FIG. 3B). For example, an equal number of light receiving elements 9 are included in each block B. The number of light receiving elements 9 included in each block B can be set to a desired number. For example, a number of light receiving elements 9 corresponding to the width of the average gap between two rod lens arrays 7 can be set as the number of light receiving elements 9 included in a single block B.

The correction unit 12 compares the output values from each of the light receiving elements 9 from the image sensor 8 when scanning the correction scanning object with the blocks B and identifies light receiving elements 9 subject to correction. The correction unit 12 then corrects the black reference values of the light receiving elements 9 subject to correction so identified.

A process of setting a black reference value correction value for eliminating streaking will be described with reference to FIG. 17. As in the case of the first and second embodiments, "Start" in FIG. 17 is the point in time when the correction value for eliminating streaking caused by ambient light entering in through the gaps between rod lens arrays 7 is set.

First, the scanning controller unit 30 lights the light source 67 of each scanning unit 6 (step #51). The scanning controller unit 30 then causes each scanning unit 6 to scan several lines of the correction scanning object, which is a correction reference strip 28 or a black single-color correction document D (step #52). After this scanning is complete, the light source 67 is extinguished. Based on the output values from the image sensor 8 of each scanning unit 6, the correction unit 12 determines an output value for each of the light receiving elements 9 of the image sensor 8 by averaging the output values of each of the light receiving elements 9, and retains the values in the reference value retainer 122 (step #53).

Next, the correction unit 12 determines a representative output value for each block B, with a plurality of light receiving elements 9 within a fixed range being considered one block B (step #54). The correction unit 12 may determine the average output value for each of the light receiving elements 9 in each block B, and take that average value as the representative value for each block B. Alternatively, the output value from a light receiving element 9 at a specific position within the block B (for instance, at the head, center, or tail of the block B) may be taken as the representative value.

The correction unit 12 then determines the difference between the representative values of adjacent blocks B (step #55). The correction unit 12 identifies those light receiving elements 9 in blocks B with brighter representative values out of those combinations of blocks B where the difference in the representative values is equal to or greater than a predetermined threshold value as light receiving elements 9 subject to correction for each scanning unit 6 (step #56). The threshold value may be any desired value, but it is possible to set a difference in output values such that streaking (white streaks) occurs when image data is formed as the threshold value. When the rod lens arrays 7 are connected with enough precision that there are no gaps therebetween, the difference between representative values may fall within the threshold. In such a case, the correction unit 12 identifies no light receiving elements 9 as light receiving elements 9 subject to correction.

The storage unit (may be the storage unit 123 within the correction unit 12 or the storage unit 36 of the scanning controller unit 30) stores the positions of the light receiving elements 9 subject to correction and the absolute values of the differences between the representative values of blocks B containing light receiving elements 9 subject to correction and a comparison representative value based on the representative value of a block B not including light receiving elements 9 subject to correction as a black reference value correction value for scanning for each scanning unit 6 (step #57). The comparison representative value may be the average representative value of a plurality of blocks B not containing light receiving elements 9 subject to correction, or may be the representative value of an arbitrarily selected block B.

In actual scanning using the correction value, the correction value is used in the same way as in the first embodiment (see FIG. 12). In other words, scanning need only be performed as shown in FIG. 12.

In this way, the correction unit 12 obtains an output value for each of the light receiving elements 9 when a pre-prepared correction scanning object (correction reference strip 28 or correction document D) of a uniform intensity is scanned; determines a representative value for each block B, with a connected plurality of light receiving elements 9 within a fixed range being considered one block B; determines the difference between representative values for adjacent blocks B; identifies those light receiving elements 9 within blocks B whose representative values are brighter than adjacent blocks B as light receiving elements 9 subject to correction; and corrects the black reference values of the light receiving elements 9 subject to correction. It is thereby possible to perceive and identify joints between rod lens arrays 7 simply by scanning the correction scanning object (likewise for fourth embodiment).

The image scanning device 1 of this embodiment also has a storage unit (storage unit 36, storage unit 123, or the like) for storing data; the correction scanning object (correction reference strip 28 or correction document D) is black; the storage unit stores the positions of the light receiving elements 9 subject to correction and the absolute value of the differences between those blocks B containing light receiving elements 9 subject to correction and a comparison representative value based on the representative values of blocks B not containing light receiving elements 9 subject to correction as a correction value; and the correction unit 12 determines the black reference value of each of the light receiving elements 9 based on the output value from each of the light receiving elements 9 when the light source 67 is unlit, and performs correction in which the black reference value of the light receiving elements 9 subject to correction is reduced by the amount of the correction value. Through this, only the black reference value is reduced by correction, and quantization is performed along a larger range between the black reference value and the white reference value, so that the output values of the light receiving elements 9 subject to correction are quantized so as to become darker overall than before correction. The storage unit stores the positions and correction values of the light receiving elements 9 subject to correction. Because the positions of the joints between rod lens arrays 7 are fixed, it is possible through this to constantly perform correction eliminating the effects of ambient light simply by scanning a black correction scanning object one time.

(Fourth Embodiment)

Figure 18:
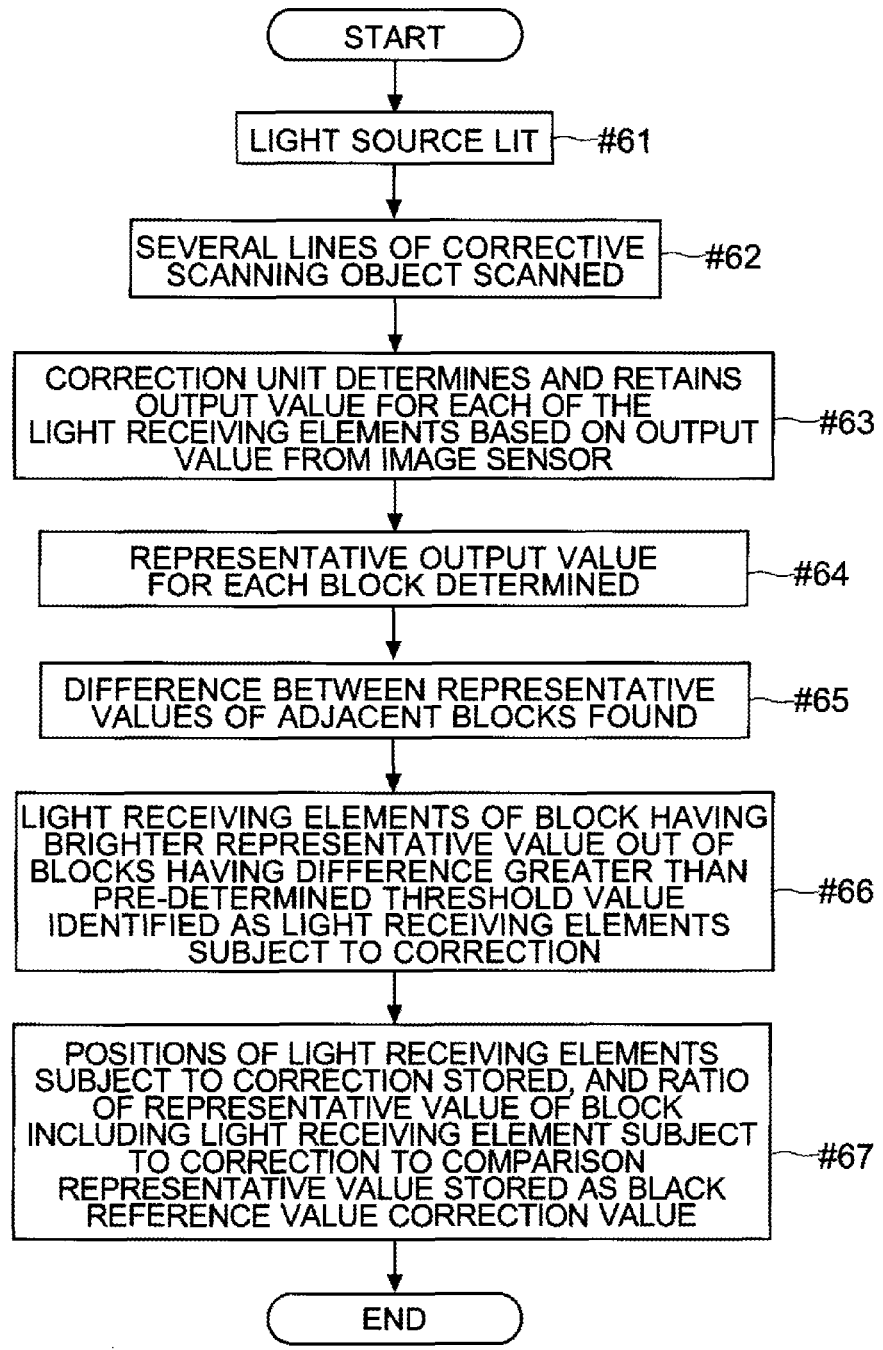
FIG. 18 is a flow chart showing one example of a process of setting a correction value for eliminating streaking.

Next, a process of setting a correction value for eliminating streaking according to a fourth embodiment will be described with reference to FIG. 18. FIG. 18 is a flow chart showing one example of a process of setting a correction value for eliminating streaking.

This embodiment, like the third embodiment, differs from the first and second embodiments in that light receiving elements 9 affected by ambient light entering through the joints between rod lens arrays 7 are identified simply by scanning a correction scanning object, and the black reference value of the light receiving elements 9 identified by the correction unit 12, which are considered light receiving elements 9 subject to correction, is corrected.

The fourth embodiment differs from the third embodiment in that a correction scanning object that is not solid black is scanned and a correction value for eliminating streaking is set. With regard to other points, the fourth embodiment may be similar to the third embodiment, and will be considered to incorporate the description of the first through third embodiments, with any description or drawings of any parts in common being omitted.

In this embodiment, a correction scanning object of a color other than black is used. For example, the correction scanning object of this embodiment is a correction reference strip 28 of a gray of uniform intensity or a gray correction document D (the object may also be colored). A white reference strip or document is not used for the correction scanning object. For instance, the first scanning unit 61 is provided with a correction reference strip 28 of a deep gray color underneath the guide member 26 (see FIG. 2). The second scanning unit 62 is provided in advance with a correction document D of a deep color (for example, gray), as shown in FIG. 14. A correction scanning object is set in the document feeding device 2, and the second scanning unit 62 is made to scan the correction scanning object. It is also possible to set a correction scanning object in the document feeding device 2 or manual scanning contact glass 32 of the first scanning unit 61 as well, and to scan the correction scanning object. Thus, a gray correction document D can be used as a correction scanning object in the first scanning unit 61 as well.

As described in the case of the first embodiment using FIG. 9, the output value of the image sensor 8 from scanning the correction scanning object increases in light receiving elements 9 affected by ambient light entering through joints between rod lens arrays 7. In this embodiment, as in the case of the third embodiment, the light receiving elements 9 arrayed in rows in the image sensor 8 are divided into a plurality of blocks B. Each block B may include, for example, anywhere from several to several dozen light receiving elements 9. For example, a number of light receiving elements 9 equal to the width of the average gap between two rod lens arrays 7 can be set as the number of light receiving elements 9 included in a single block B.

The output values from each of the light receiving elements 9 of the image sensor 8 when scanning the correction scanning object with the blocks B are compared, and those light receiving elements 9 subject to correction identified. The correction unit 12 then obtains the black reference value correction value for the light receiving elements 9 subject to correction so identified.

A process of setting a black reference value correction value for eliminating streaking will be described with reference to FIG. 18. As in the case of the first and second embodiments, "Start" in FIG. 18 is the point in time when the correction value for eliminating streaking caused by ambient light entering in through the gaps between rod lens arrays 7 is set.

Apart from the correction scanning object not being solid black, steps #61 through #66 of FIG. 18 are similar to steps #51 through #56 of FIG. 17. As such, steps #61 through #66 will be considered to incorporate the above description of the relevant points, and a description thereof will be omitted.

The storage unit (may be the storage unit 123 within the correction unit 12 or the storage unit 36 of the scanning controller unit 30) stores the positions of the light receiving elements 9 subject to correction and the ratio of the representative values of blocks B containing light receiving elements 9 subject to correction to a comparison representative value based on the representative value of a block B not including light receiving elements 9 subject to correction as a black reference value correction value for scanning for each scanning unit 6 (step #67). The comparison representative value of step #67 may be the average representative value of a plurality of blocks B not containing light receiving elements 9 subject to correction, or may be the representative value of an arbitrarily selected block B. Through this, the ratio is used to correct the black reference value of the light receiving elements 9 subject to correction during subsequent scannings. The ratio is calculated by the correction unit 12 (or by the scanning controller unit 30).

In actual scanning using the correction value, the correction value is used in the same way as in the second embodiment (see FIG. 16). In other words, scanning need only be performed as shown in FIG. 16.

As described above, the image scanning device 1 of this embodiment has a storage unit (storage unit 36, storage unit 123, or the like) for storing data; the correction scanning object (correction reference strip 28 or correction document D) is gray or colored and has a uniform intensity; the correction unit 12 determines the ratio of the representative values of blocks B containing light receiving elements 9 subject to correction to a comparison representative value based on the representative value of a block B not containing light receiving elements 9 subject to correction; the storage unit stores the position and ratio of each of the light receiving elements 9 subject to correction; and the correction unit 12 determines the black reference value of each of the light receiving elements 9 based on the output value from each of the light receiving elements 9 when the light source 67 is unlit, and performs correction reducing the black reference values of the light receiving elements 9 subject to correction by multiplying or dividing the black reference value by the ratio. It is thereby possible to properly correct the black reference value of the light receiving elements 9 subject to correction even when the correction scanning object is not black. The storage unit stores the positions and ratios of the light receiving elements 9 subject to correction. Because the positions of the joints between rod lens arrays 7 are fixed, it is possible through this to constantly perform correction eliminating the effects of ambient light simply by scanning a correction scanning object (correction reference strip 28 or correction document D) one time.

The correction unit 12 takes the average output value for each of the light receiving elements 9 included in the block B, or the output value of one light receiving element 9 out of those light receiving elements 9 contained in the block B, as the representative value. It is thereby possible to compares values for each block B (likewise in the third embodiment).

(Fifth Embodiment)

Figure 19:
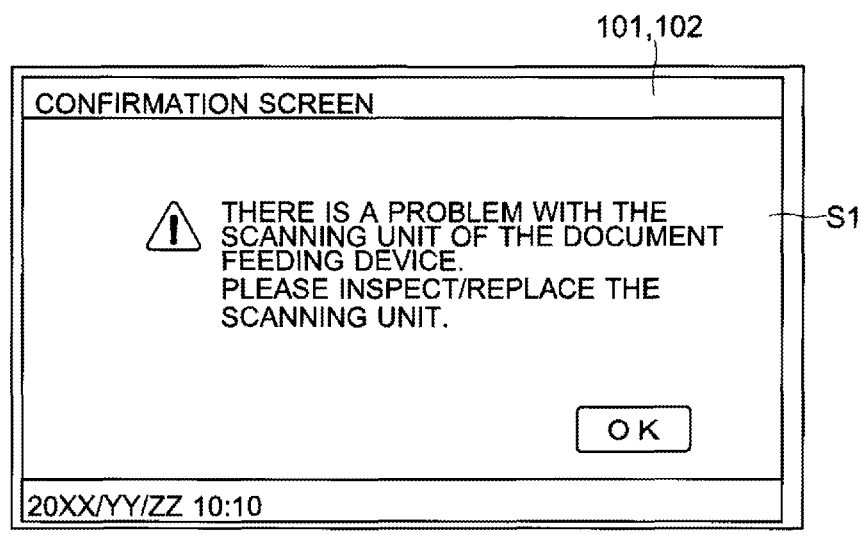
FIG. 19 is an illustrative view of one example of an alert screen displayed on an LCD.

Next, a fifth embodiment will be described with reference to FIG. 19. FIG. 19 is an illustrative view of one example of an alert screen Si displayed on an LCD 101.

In the first through the fourth embodiments, examples of correction eliminating the effects of ambient light entering through gaps between rod lens arrays 7 were described. However, due to manufacturing-related circumstances, deterioration over time, or the like, there may in rare cases be instances where the gaps between rod lens arrays 7 are too wide to correct.

There is a limit to the amount of correction that can be effected, and there may be instances where it is not possible to completely eliminate streaking, even though the occurrence of streaking may be reduced to a certain degree by correction. When the effects of ambient light entering through gaps are great, and the absolute value of the difference between the first output value and the second output value is greater than a predetermined acceptable limit value (first and second embodiments), or when the absolute value of the difference between the representative values of adjacent blocks B is greater than a predetermined acceptable limit value (third and fourth embodiments), for example, the correction unit 12 notifies the controller unit 11 of this fact via the scanning controller unit 30. After receiving such notification, the controller unit 11 displays the alert screen S1 containing a message such as that shown in FIG. 19 on the LCD 101 (corresponding to a warning unit) of the control panel 10. As shown in FIG. 19, the LCD 101 indicates, for instance, that there is a problem with the scanning unit 6 or that a replacement or inspection needs to be performed, and the location of the scanning unit 6 in which the problem has occurred.

The acceptable limit value may be set as desired according to the output values from each of the light receiving elements 9. For example, it is acceptable to designate an acceptable gap size between rod lens arrays 7 in advance, determine the amount by which the output values of the light receiving elements 9 increase due to ambient light in the case of an acceptable gap size through experimentation, and designate that output value increase amount as the acceptable limit value. Alternatively, the amount by which the output values of the light receiving elements 9 increase due to ambient light of an intensity such that streaking occurs even when correction is performed may be found through experimentation, and this output value increase amount designated as the acceptable limit value. The acceptable limit value is stored in, for example, the storage unit 123 or the storage unit 36, and is accessed by the correction unit 12 when the black reference value correction value is being set in order to confirm whether or not the acceptable limit value has been exceeded.

The correction value used when scanning the correction scanning object and correcting the black reference value is set during inspection prior to being shipped out from the factory or the like. The value may also be set by a service representative performing maintenance on the multifunction peripheral 100. Therefore, an individual inspecting or servicing the multifunction peripheral 100 can be appraised that there is a problem in a scanning unit 6 upon shipping the machine out from the factory or regular maintenance performance. Thus, it is possible to prevent a problematic multifunction peripheral 100 from being shipped out or used.

As described above, the image scanning device 1 of this embodiment has a warning unit (LCD 101) that issues messages to a user, and the warning unit (LCD 101) issues a warning when the absolute value of the difference between the first output value and the second output value is greater than a pre-determined acceptable limit value, or when the absolute value of the difference between the representative values of adjacent blocks B is greater than a pre-determined acceptable limit value. It is thereby possible to issue a notification (warning) that a gap between rod lens arrays 7 is unacceptably large, and that enough ambient light is entering through the gap that correction is impossible. Thus, it is possible for a user to be made aware that a rod lens array 7 needs to be replaced.

What is claimed is:

1. An image scanning device comprising:
   an image sensor including an array of a plurality of light receiving elements;
   a light source for shining light upon a scanning object;
   a lens unit for guiding reflected light from the scanning object to the image sensor and having a joined plurality of rod lens arrays, in which rod lenses are arrayed;
   a correction unit for correcting pixel values of pixels corresponding to a position of a joint between the rod lens arrays in image data generated based on output values from the light receiving elements of the image sensor; and
   a storage unit for storing data, wherein,
   based on the size of the output values from the light receiving elements, the correction unit performs quantization for converting the output values into pixel values falling in a range between a black reference value and a white reference value, generates digital image data from the output of the image sensor, and corrects the black reference value of light receiving elements subject to correction, which are those light receiving elements corresponding to the positions of joints between the rod lens arrays, and
   there is determined a ratio between the second output value from the light receiving elements subject to correction when a pre-prepared gray or colored correction scanning object of a uniform color intensity is scanned and a comparison value based on the second output value from a light receiving element other than the light receiving elements subject to correction;
   the storage unit stores the position and ratio of the light receiving elements subject to correction; and
   the correction unit determines the black reference value for each of the light receiving elements based on output values from each of the light receiving elements when the light source is unlit, and performs correction in which the black reference value of the light receiving elements subject to correction is multiplied by or divided by the ratio, and the black reference value is reduced.

2. An image scanning device comprising:
   an image sensor including an array of a plurality of light receiving elements;
   a light source for shining light upon a scanning object;
   a lens unit for guiding reflected light from the scanning object to the image sensor and having a joined plurality of rod lens arrays, in which rod lenses are arrayed; and
   a correction unit for correcting pixel values of pixels corresponding to a position of a joint between the rod lens arrays in image data generated based on output values from the light receiving elements of the image sensor;
   wherein based on the size of the output values from the light receiving elements, the correction unit performs quantization for converting the output values into pixel values falling in a range between a black reference value and a white reference value, generates digital image data from the output of the image sensor, and corrects the black reference value of light receiving elements subject to correction, which are those light receiving elements corresponding to the positions of joints between the rod lens arrays, and
   the correction unit obtains an output value for each of the light receiving elements when a pre-prepared correction scanning object of a uniform intensity is scanned; determines a representative value for individual blocks, where a connected plurality of light receiving elements within a fixed range being considered one block; determines the difference between representative values for adjacent blocks; identifies, as light receiving elements subject to correction, those light receiving elements within blocks whose representative values are brighter than adjacent blocks; and corrects the black reference values of the light receiving elements subject to correction.

3. The image scanning device according to claim 2, further comprising:
   a storage unit for storing data, wherein:
   the correction scanning object is black;
   the storage unit stores as correction values the position of the light receiving elements subject to correction and the absolute value of the difference between the block including a light receiving element subject to correction and a comparison representative value based on the representative value of a block not including a light receiving element subject to correction; and
   the correction unit determines the black reference value for each of the light receiving elements based on output values from each of the light receiving elements when the light source is unlit, and performs correction in which the black reference value of the light receiving elements subject to correction is reduced by the amount of the correction value.

4. The image scanning device according to claim 2, further comprising:
   a storage unit for storing data, wherein:
   the correction scanning object has a uniform color intensity and is gray or colored;
   the correction unit determines a ratio between the representative value of a block including a light receiving element subject to correction and a comparison representative value based on the representative value of a block not including a light receiving element subject to correction;
   the storage unit stores the position and ratio of the light receiving element subject to correction; and
   the correction unit determines the black reference value for each of the light receiving elements based on an output value from each of the light receiving elements when the light source is unlit, and performs correction in which the black reference value of the light receiving element subject to correction is multiplied by or divided by the ratio, and the black reference value is reduced.

5. The image scanning device according to claim 2, wherein:
   the correction unit takes as a representative value the average output value of each of the light receiving elements in the block or the output value of one light receiving element out of the light receiving elements included in the block.

6. The image scanning device according to claim 2, further comprising:
- a warning unit for warning a user using a message; wherein:
- the warning unit issues an alert when the absolute value of the difference between the representative values of adjacent blocks is greater than a pre-determined acceptable limit value.

7. The image scanning device according to claim 2, wherein:
- the correction scanning object is a document of a uniform color intensity, or a reference strip provided at a position capable of being scanned by the image sensor.

* * * * *